(12) United States Patent
van Houtum et al.

(10) Patent No.: US 12,360,203 B2
(45) Date of Patent: Jul. 15, 2025

(54) PHASE NOISE REDUCTION FOR SYMMETRIC BISTATIC RADAR

(71) Applicant: NXP B.V., Eindhoven (NL)

(72) Inventors: Wilhelmus Johannes van Houtum, Sint-oedenrode (NL); Arie Geert Cornelis Koppelaar, Eindhoven (NL)

(73) Assignee: NXP B.V., Eindhoven (NL)

( * ) Notice: Subject to any disclaimer, the term of this patent is extended or adjusted under 35 U.S.C. 154(b) by 471 days.

(21) Appl. No.: 17/712,445

(22) Filed: Apr. 4, 2022

(65) Prior Publication Data

US 2023/0314562 A1 Oct. 5, 2023

(51) Int. Cl.
*G01S 7/35* (2006.01)
*G01S 13/931* (2020.01)

(52) U.S. Cl.
CPC .............. *G01S 7/35* (2013.01); *G01S 13/931* (2013.01)

(58) Field of Classification Search
CPC .................................. G01S 7/35; G01S 13/931
See application file for complete search history.

(56) References Cited

U.S. PATENT DOCUMENTS

| | | | |
|---|---|---|---|
| 8,559,554 B2 | 10/2013 | Vossiek et al. | |
| 1,102,818 A1 | 5/2021 | Vossiek et al. | |
| 11,016,169 B2 | 5/2021 | Vossiek et al. | |
| 2016/0043465 A1* | 2/2016 | McDevitt | G01S 13/91 |
| | | | 342/368 |
| 2017/0176583 A1* | 6/2017 | Gulden | G01S 13/50 |
| 2019/0004145 A1 | 1/2019 | Vossiek et al. | |
| 2019/0369221 A1* | 12/2019 | Umehira | G01S 13/34 |
| 2020/0018840 A1 | 1/2020 | Vossiek et al. | |
| 2021/0239788 A1* | 8/2021 | Arage | G01S 7/032 |
| 2022/0146623 A1* | 5/2022 | Lao | G01S 13/44 |
| 2022/0334217 A1* | 10/2022 | Gulden | G01S 13/87 |
| 2023/0033995 A1* | 2/2023 | Lee | G01S 7/0234 |
| 2023/0111983 A1 | 4/2023 | Van Houtum | |

FOREIGN PATENT DOCUMENTS

| | | |
|---|---|---|
| DE | 102014104273 A1 | 10/2015 |
| DE | 102019124120 A1 | 3/2021 |

OTHER PUBLICATIONS

Gottinger et al: "Coherent Signal Processing for Loosely Coupled Bistatic Radar", IEEE Transactions on Aerospace and Electronic Systems, vol. 57, No. 3, Jan. 11, 2021 (Jan. 11, 2021), pp. 1855-1871.

(Continued)

*Primary Examiner* — Wiliam Kelleher
*Assistant Examiner* — Hailey R Le

(57) ABSTRACT

Phase noise reduction is described for symmetric bistatic radar. In one example, a first beat signal is generated of a second signal received at a first antenna and a third beat signal is generated at a second antenna of a first linear antenna array. A second beat signal is generated of a first signal received at a first antenna of a second linear antenna array. The first beat signal and the third beat signal are multiplied with the complex conjugate of the second beat signal to generate products that are combined to generate a phase estimation correction term that is applied to first and second sets of radar return signals.

20 Claims, 10 Drawing Sheets

(56) References Cited

OTHER PUBLICATIONS

Horlin, F. et al. "Digital compensation for analog front-ends," Wiley, 2008, pp. 56-59.
Hakobyan, Gor, "Orthogonal Frequency Division Multiplexing Multiple-Input Multiple-Output Automotive Radar with Novel Signal Processing Algorithms", (2018), 188 pgs.
Gottinger, Michael et al. "Coherent Automotive Radar Networks: The Next Generation of Radar-Based Imaging and Mapping", IEEE Journal of Microwaves, vol. 1, No. 1, Jan. 7, 2021, p. 149-163.
Gottinger, Michael et al., "Coherent Full-Duplex Double-Sided Two-Way Ranging and Velocity Measurement Between Separate Incoherent Radio Units", IEEE Transaction on Microwave, Theory and Techniques, vol. 67, No. 5, May 2019, pp. 2045-2061.

\* cited by examiner

PHASE NOISE REDUCTION FOR SYMMETRIC BISTATIC RADAR

BACKGROUND

Integrated circuitry and silicon waveguides have allowed radio detection and ranging (radar) to be brought to a wide variety of short and medium range applications. An inexpensive Digital Signal Processor (DSP) can be used to generate complex chirp signals to be emitted by radar antennas. More DSPs can be used to process the returns received from targets in the scene within the field of view (FOV) of the radar transmitters. A silicon processor can be used to analyze the processed returns to generate a scene.

Radar is already in wide use in motor vehicles for bumper-mounted parking sensors. These sensors are optimized for detecting fixed objects a meter or two away when the vehicle is moving slowly. Advanced driver assistance systems (ADAS) and autonomous vehicles can require sensors that detect moving objects a hundred meters away while the vehicle is moving at 100 km/h or faster. Bumper-mounted radar is one sensor being used for such applications. Radar systems with such capabilities at a cost appropriate for motor vehicles can be adapted to many other applications.

SUMMARY

Embodiments of a method and device are disclosed. In an embodiment, a method of reducing phase noise in radar return signals from bistatic linear antenna arrays is disclosed. In an embodiment, the method involves emitting a first signal from antennas of a first linear antenna array, emitting a second signal from antennas of a second linear antenna array, receiving reflected signals of the first signal at the antennas of the second linear antenna array as a first set of radar return signals, receiving reflected signals of the second signal at the antennas of the first linear antenna array as a second set of radar return signals, generating a first beat signal of a first reflected signal at an antenna of the first linear antenna array, generating a second beat signal of a second reflected signal at an antenna of the second linear antenna array, generating a third beat signal of the second reflected signal received at a second antenna of the second linear antenna array, taking a complex conjugate of the second beat signal, multiplying the first beat signal with the complex conjugate of the second beat signal and multiplying the third beat signal with the complex conjugate of the second beat signal to produce a first product and a second product, combining the first product and the second product to generate a phase estimation correction term, and applying the phase estimation correction term to the first set of radar return signals and to the second set of radar return signals.

In an embodiment, the method includes generating a fourth beat signal of the first reflected signal received at a second antenna of the first linear antenna, taking a complex conjugate of the fourth beat signal, and multiplying the first beat signal with the complex conjugate of the fourth beat signal to produce a third product, wherein generating the phase estimation correction term further comprises combining the third product with the first product and the second product.

In an embodiment, the distance between the first and the second antennas of the first linear antenna array is equal to the distance between the first antenna and the second antenna of the second linear antenna array.

In an embodiment, multiplying includes multiplying the first beat signal in the frequency domain with the complex conjugate of the second beat signal in the frequency domain and multiplying the third beat signal in the frequency domain with the complex conjugate of the second beat signal in the frequency domain.

In an embodiment, the first reflected signal is transmitted by the second linear antenna array, wherein the second reflected signal is transmitted by the first linear antenna array, wherein generating the first beat signal comprises down-converting the first reflected signal from a first antenna of the second linear antenna array with a transmitted signal of the first linear antenna array, wherein generating the second beat signal comprises down-converting the second reflected signal from a first antenna of the first linear antenna array with a transmitted signal of the second linear antenna array, and wherein generating the third beat signal comprises down-converting the first reflected signal from a second antenna of the second linear antenna array with a transmitted signal of the first linear antenna array.

In an embodiment, applying the phase estimation correction term comprises applying the phase estimation correction term to each reflected signal at each antenna of the first linear antenna array and the second linear antenna array.

In an embodiment, applying the phase estimation correction term comprises applying the phase estimation correction term to the first set of radar return signals and the second set of radar return signals in the frequency domain.

In an embodiment, the antenna of the first linear antenna array and the antenna of the second linear antenna array are virtual antennas between a first physical antenna array and a second physical antenna array.

In an embodiment, the first linear antenna array and the second linear antenna array are separated by a fixed and known distance.

In an embodiment, the first linear antenna array and the second linear antenna array have approximately the same spacing between antennas.

An embodiment further includes comparing the third beat signal and the fourth beat signal to a frequency threshold and multiplying comprises multiplying in response to the third beat signal and the fourth beat signal exceeding the frequency threshold.

In an embodiment, the first signal and the second signal are Frequency Modulated Continuous Wave (FMCW) modulated.

An embodiment further includes performing a clock rate equalization of signal sources used for generation of the first signal and the second signal.

An embodiment further includes determining a position of an object using the corrected first set of radar return signals and the corrected second set of radar return signals.

An embodiment of a non-transitory computer-readable medium is disclosed. The medium has instructions stored thereon that when operated on by the computer cause the computer to perform the operations of the above embodiments.

An embodiment of an apparatus is disclosed. The apparatus includes a first linear antenna array configured to emit a first signal from antennas of the first linear antenna array and to receive reflected signals and to receive reflected signals of a second signal at the antennas of the first linear antenna array as a second set of radar return signals, a second linear antenna array configured to emit the second signal from antennas of the second linear antenna array and to receive reflected signals of the first signal at the antennas of the second linear antenna array as a first set of radar return signals, a first mixer configured to generate a first beat signal of a first reflected signal at an antenna of the first linear antenna array, a second mixer configured to generate a second beat signal of a second reflected signal at a first antenna of the second linear antenna array and to generate a third beat signal of the second reflected signal at a second antenna of the second linear antenna array, an initial phase estimation module configured to take a complex conjugate of the second beat signal, to multiply the first beat signal with the complex conjugate of the second beat signal, to multiply the third beat signal with the complex conjugate of the second beat signal, to generate a phase estimation correction term, and to apply the phase estimation correction term to the first set of radar return signals and to the second set of radar return signals.

An embodiment further includes a first fast Fourier transform to convert the first set of radar return signals to the frequency domain, and a second fast Fourier transform to convert the second set of radar return signals to the frequency domain, wherein the initial phase estimation module is to apply the phase estimation correction term to the frequency domain transformation of the first set of radar return signals and to apply the phase estimation correction term to the frequency domain transformation of the second set of radar return signals.

In an embodiment, the antenna of the first linear antenna array and the antenna of the second linear antenna array are characterized as virtual antennas between a first physical antenna array and a second physical antenna array.

In an embodiment, the first linear antenna array and the second linear antenna array are separated by a predetermined fixed distance and wherein the first linear antenna array and the second linear antenna array have approximately the same spacing between antennas.

In an embodiment, the distance between the first and second antennas of the first linear antenna array is equal to a distance between the first and second antennas of the second linear antenna array.

An embodiment further includes a processor configured to determine a position of an object using the corrected first set of radar return signals.

Other aspects in accordance with the invention will become apparent from the following detailed description, taken in conjunction with the accompanying drawings, illustrated by way of example of the principles of the invention

DETAILED DESCRIPTION

Figure 1:
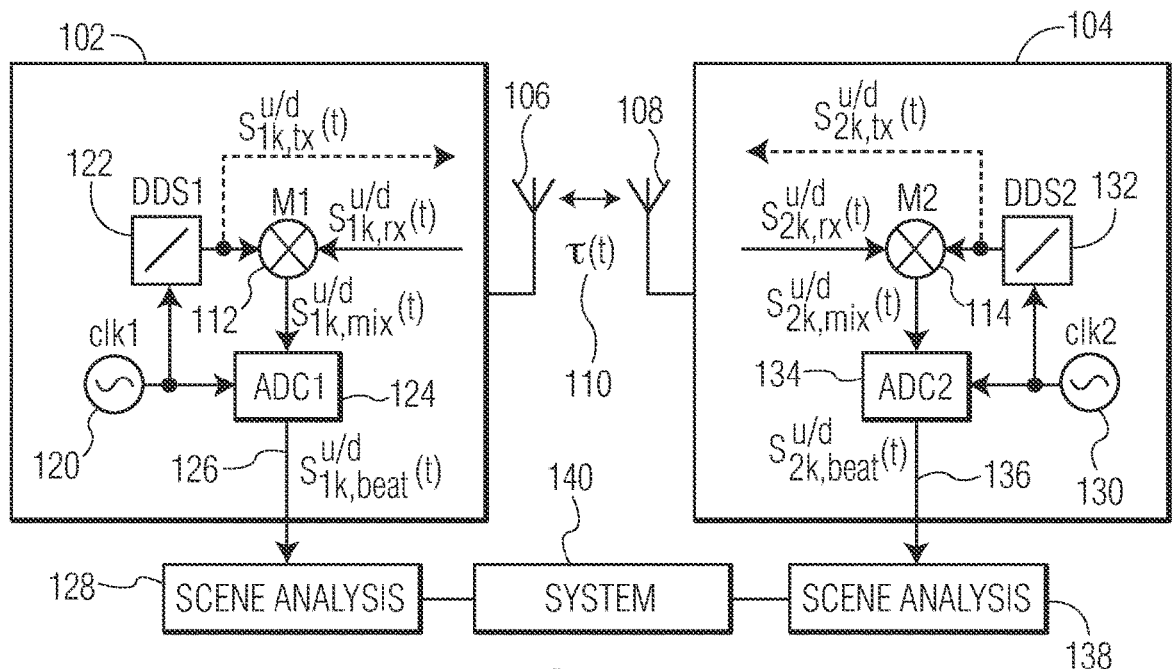
FIG. 1 is a block diagram of two radar stations with independent system clock sources.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Phase noise reduction may be performed with estimation and correction as described herein. The estimation and correction may be applied to phase noise (PN) in radar scenes and significantly reduces the PN, particularly for bistatic radar arrays. Linear antenna arrays may be used without overlapping antennas. This allows the antenna aperture to be increased, and allows for more array configurations, increasing the direction resolution. The structure and technique use a combination of the phase rotations between the antennas of the linear antenna array in the time-distance space, e.g. before and after a one-dimensional fast Fourier transform to reduce the amount of PN power in the resulting beat signals. The combination is a particular integral product of bistatic beat signals.

A phase noise (PN) reduction apparatus and technique are described for wireless locating and velocity measurement between separate radar stations. The apparatus and technique apply to wireless locating and aid with coherent ranging, continuous phase tracking, and velocity measurement between radar stations that operate incoherently with separate low-cost crystal oscillator clock sources.

FIG. 1 is a block diagram of two radar stations with independent system clock sources. The radar stations may be fixed or mobile. Frequency modulated continuous wave (FMCW) chirp sequence signals, for example, are exchanged in a full duplex (FD) manner between a first radar station 102 and a second radar station 104 through a first antenna 106 and a second antenna 108. The chirp sequence signals 110 transmitted from the first radar station 102 and the second radar station 104 are received, respectively, by each of the two units and down-converted in a first mixer 112 and second mixer 114, respectively, with the respective receiver's own transmit signal to generate a beat signal in each unit.

In particular, the first radar station 102 has a first clock 120, such as a crystal oscillator with suitable output circuits, that is coupled to a direct digital synthesizer (DDS) radio frequency (RF) generator 122. The output of the RF generator 122 is fed to the first mixer 112 to generate a mixer output signal. The mixer output signal is provided to an analog-to-digital converter (ADC) 124 to generate a digital version of a first beat signal 126.

Similarly, the second radar station 104 has a second clock 130 that is coupled to an RF generator 132. The output of the RF generator 132 is fed to the second mixer 114 to generate a mixer output signal. The mixer output signal is provided to an ADC 134 to generate a digital version of a second beat signal 136. Due to the use of different clocks and the lack of any clock connection between the first radar station 102 and the second radar station 104, the radar stations are referred to as incoherent. Because the first antenna 106 receives signals transmitted from the second antenna 108 and vice-versa, the radar stations are referred to as bistatic. If there are multiple receiving or transmitting antennas, then the system may be referred to as multi-static.

The first beat signal 126 and the second beat signal 136 are then processed together, after the beat signal from one radar station is transmitted to the other radar station. Phase coherent range and Doppler phase measurements are made between the incoherent radar stations. In embodiments, the bistatic or multi-static measurements may be used to derive otherwise unknown synchronization parameters from the first beat signal 126 and the second beat signal 136 from the ADC samples. PN compensation and velocity measurements are also made for localization applications or the detection of passive targets.

The beat signals are provided to one or more processors for analysis. As shown, a first scene analysis module 128 is coupled to the first radar station 102 to determine a position of an object, such as a target in the scene that is within the field of view of the first radar station. A second scene analysis module 138 is coupled to the second radar station 104 to determine a position of the object in the scene. The resulting analysis is provided to a system 140 to generate a scene, perform target analysis, generate alerts, or perform other actions. The first scene analysis module 128 may be incorporated in or with the first radar station or be incorporated into the system 140. In some embodiments, the results from the first radar station are provided to the second scene analysis module 138 to allow the results to be compared. In some embodiments, this comparison is done in the system 140.

In embodiments, the structures and techniques for phase noise (PN) reduction reduce noise-like distortions caused by mixing the products of uncorrelated phase noise and preserve the direction information embedded in the linear phase rotation between antennas of an antenna array. This direction information is later useful for obtaining azimuth and elevation information of the target scene, e.g. direction-of-arrival (DoA) or equivalently angle-of-arrival (AoA) information. In the description below DoA and AoA are used interchangeably. To the extent that DoA and AoA are different, the structures and techniques for one may be used for the other in every instance. Described embodiments reduce the noise level and enhance the dynamic range of the ranging signals and preserve the direction information.

Frequency Modulated Continuous Wave (FMCW) Radar Signals

Figure 2:
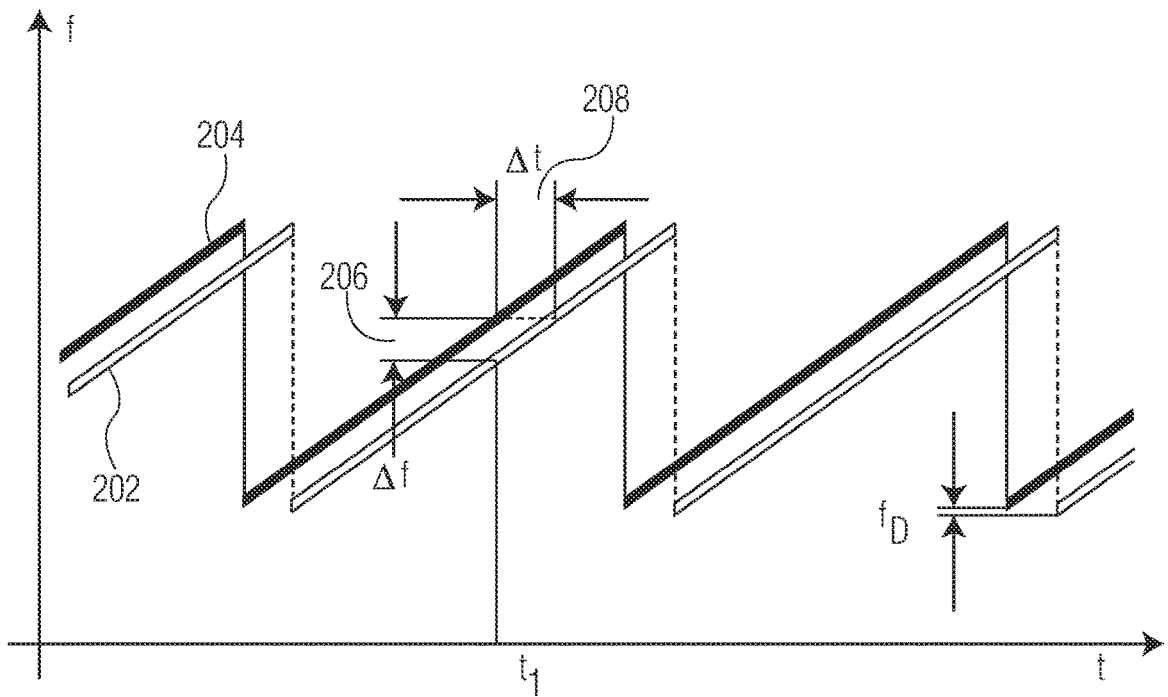
FIG. 2 is a graph diagram of frequency versus time to show ranging using an FMCW radar system.

In (FMCW) radar systems, a high frequency sine wave is used as a carrier wave. In addition, range information is mixed with the Doppler velocity using this technique. Modulation can be turned off on alternate scans to identify velocity using unmodulated carrier frequency shifts. This allows range and velocity to be found with one radar set or alternatively, with a two-dimensional (2D) fast Fourier transform (FFT), the fast-chirp version of FMCW. Triangle wave modulation can be used to achieve the same goal. FIG. 2 is a graph diagram of frequency versus time to show ranging using an FMCW radar system. A received waveform 202 is a delayed replica of a transmitted waveform 204. The transmitted frequency is used to down-convert the receive waveform 202 to baseband, and the amount of frequency shift 206 between the transmitted waveform 204 and the received waveform 202, a reflected signal, increases with time delay 208 which is the distance that correlates with the radio signal propagation time from the transmitting antenna to the target and then to the receiving antenna. The time delay is therefore a measure of the range; a small frequency spread is produced by nearby reflections; a larger frequency spread corresponds with more time delay and a longer range.

With the advent of modern electronics, digital signal processing is used for most detection processing. The analog beat signals are passed through an analog-to-digital converter (ADC), and digital processing is performed on the resulting digital beat signals. Mathematical equations representing the generator/modulator and detector/demodulator, respectively, are described below.

FMCW Modulators

The mathematical equations of the generator/modulator that generates the FMCW radar signals have been explained in the literature. FMCW ranging for a linear ramp waveform may be given by Eq. 1 and Eq. 2 for the modulator part, i.e., the FMCW transmitter, $$Tx{:}x(t) = \Re\left\{\exp\left(j2\pi\left(f_c t + \frac{1}{2}\mu t^2\right)\right)\right\} \quad \text{Eq. 1}$$

where $\Re\{\bullet\}$ represents the real part, $f_c$ represents the carrier frequency, $$\mu = \frac{B_{eff}}{T_{FFT}}$$

is the chirp rate (chirp slope), $B_{eff}$ is the effective bandwidth, and $T_{FFT}$ represents the (effective) chirp duration. Accordingly, instantaneous frequency is as provided in Eq. 2.

$$\text{Inst. Freq} = \frac{1}{2\pi}\frac{d}{dt}\left(2\pi\left(f_c t + \frac{1}{2}\mu t^2\right)\right) = f_c + \mu t \quad \text{Eq. 2}$$

FMCW Detectors and Demodulators

The process of extracting an original message signal from the modulated wave is known as detection or demodulation. The circuit which demodulates the modulated wave is known as the demodulator. The demodulator tries to reconstruct the transmitted signal out of the received signal. The receive (Rx) signal for FMCW radar, after a time-of-flight (ToF) of τ, may be stated as in Eq. 3;

$$Rx{:}r(t) = \Re\left\{\exp\left(j2\pi\left(f_c(t-\tau) + \frac{1}{2}\mu(t-\tau)^2\right)\right)\right\} \quad \text{Eq. 3}$$

Next, mixing the received signal with the transmitted signal and applying low-pass filtering (LPF), yields y(t) as in Eq. 4;

$$y(t) = LPF(x(t)r^*(t)) = \Re\left\{\exp\left(j2\pi\left((\mu\tau)t + f_c\tau - \frac{1}{2}\mu\tau^2\right)\right)\right\} \quad \text{Eq. 4}$$

and the beat frequency $f_b$, i.e., the frequency of y(t) is stated in Eq. 5;

$$f_b = \frac{1}{2\pi}\frac{d}{dt}\left(2\pi\left((\mu\tau)t + f_c\tau - \frac{1}{2}\mu\tau^2\right)\right) = \mu\tau \quad \text{Eq. 5}$$

Lastly, the target distance R then is provided in Eq. 6;

$$R = \frac{1}{2}c_0\tau = \frac{1}{2}c_0\frac{f_b}{\mu} \quad \text{Eq. 6}$$

where $c_0$ is the phase velocity in free space, i.e., the speed of light ($\approx 3 \cdot 10^8$ m/s).

Figure 3:
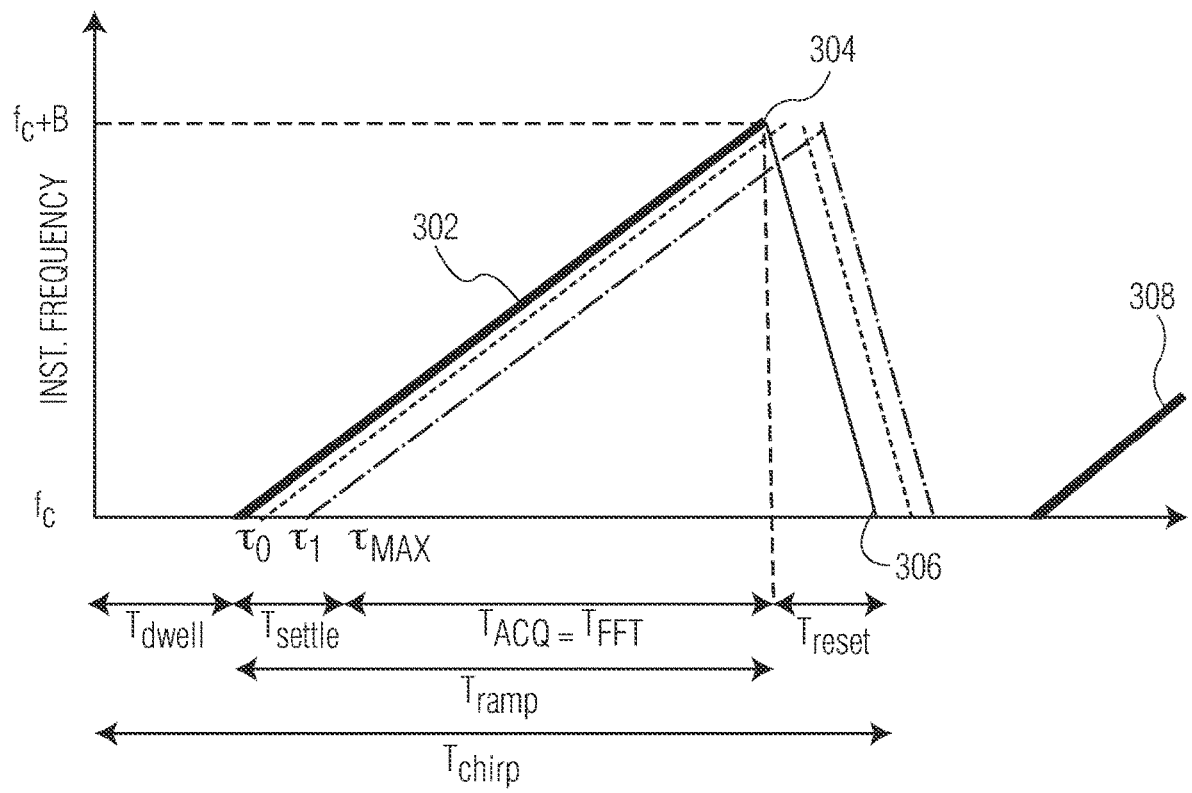
FIG. 3 is a graph of instantaneous frequency against time of a Frequency Modulated Continuous Wave chirp signal.

For practical reasons, receive samples are not processed for brief periods ($T_{dwell}, T_{settle}, T_{reset}$) after the modulation ramp begins because, e.g., incoming reflected signals will have modulation from the previous modulation cycle and the settling of circuitry like a phase locked loop (PLL), this can also be seen in FIG. 3. This imposes a range limit and limits performance.

FIG. 3 is a graph of instantaneous frequency against time of an FMCW chirp signal 302. The FMCW chirp signal 302 starts at a low $f_c$ and, through a time $T_{ramp}$, reaches a peak 304 of $f_c$+B, after $T_{ACQ}=T_{FFT}$. The FMCW chirp signal 308 then falls to a local minimum 306 of $f_c$ after a time, $T_{reset}$, and before the next chirp. The time between chirps is indicated as $T_{dwell}$. The other timings mentioned herein are also set forth including $T_{settle}$ and $T_{reset}$.

System Configuration

Figure 4:
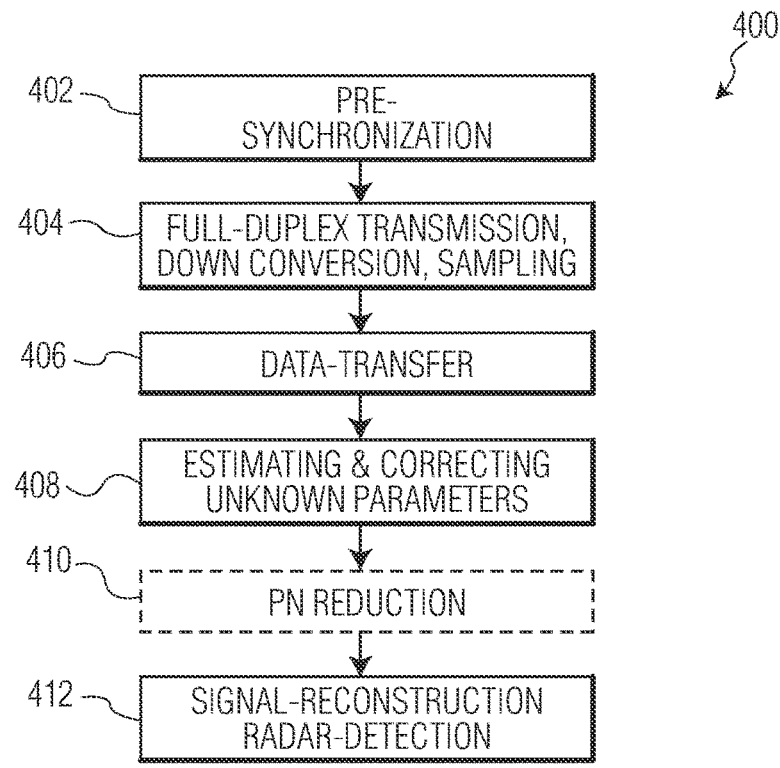
FIG. 4 is an abbreviated flow chart of a suitable system setup for a bistatic radar system.

FIG. 4 is an abbreviated flow chart 400 of a suitable system setup for a bistatic radar system as shown, for example in FIG. 1. The system uses two radar stations that operate incoherently with separate low-cost crystal oscillator clock sources.

Pre-synchronization, operation 402: Prior to the radar measurement, radar stations are pre-synchronized in time and frequency. After this operation, the Nyquist sampling criterion is fulfilled for the beat signals in baseband and unambiguous reconstruction can be performed with the digital beat signals produced by the respective ADC.

Full Duplex (FD) Transmission, Down-Conversion, and Sampling operation, 404: The relative velocity of a target in a radar scene cannot be measured by means of the phase shift in the received reflected signal over time, since the frequency offset and the Doppler shift in the received reflected signals are indistinguishable. In this operation, additional information on the relative drift of the clock sources is obtained since the velocity to be measured is proportional to the phase shift in the "slow-time" domain. (Slow-time or inter-chirp time is defined in terms of the FMCW chirp number.) In this operation, an FMCW chirp sequence is transmitted by a FD protocol and is simultaneously received and down-converted by both radar units. The results are compared to determine the relative phase shift.

Data Transfer, operation 406: ADC data in the form of digital beat signals are transferred from at least one station. These data can be processed at one or the other of the two radar stations or by an external central processing unit (CPU), or other processing resource.

Estimating and Correcting Unknown Parameters, operation 408: The unknown system parameters; relative drift in time, Doppler frequency, timing offset, and frequency offset are determined from all the data in this operation. Corrections are carried out as these parameters impact the signal phases, the beat frequencies, and the PN level.

Phase Noise Reduction, operation 410: The PN level, will optionally be reduced by the described PN reduction structure and techniques. Therefore, the effectiveness of the PN reduction operation is enhanced as the unknown parameters are corrected. Moreover, the mathematical derivation, as well as Monte-Carlo simulation results, of the PN reduction techniques herein described below are improved by more accurate correction of the unknown parameters so that these unknown parameters may be neglected. In an actual system, there will be some uncertainty due to these parameters.

Signal Reconstruction, Radar Detection, operation 412: This operation outputs bistatic signals, which are comparable to a one-unit (primary) radar response. These bistatic signals are coherent and serve to suppress the PN using PN reduction in combination with linear antenna arrays. This is done without the requirement of an overlapping antenna.

Signal Reconstruction, Radar Detection, operation 412 may correspond to the actual target detection after a 2D-FFT in the bistatic system setup and is achieved with the best performance if the PN reduction is applied in combination with linear antenna arrays. Hence, the PN reduction will be applied in operation 408 in which the distance and velocity 2D-FFTs are also applied. In operation 410, the PN reduced bistatic signals are used. Operation 408 may be applied in the time-distance domain, i.e., before and after the first one-dimensional (1D) FFT of the abbreviated flow chart 400 of FIG. 4.

Radar Principles for Plane Wave Signal Propagation

An important function of automotive radar is the detection of targets or objects in the surrounding of the vehicle or scene and the estimation of their parameters such as distance, velocity, and direction. Based on this information, environment perception is enabled for higher level functions such as advanced driver assistance systems (ADAS) and autonomous driving. These functions are common for radar systems in other applications as well and may be addressed in the same way that they are addressed in the automotive radar context.

The principle behind radar is the transmission of electromagnetic waves that are reflected from the surrounding objects, also called targets. By reception and processing of the radar signals from the radar that are reflected by targets, the presence of objects in the radar surroundings is identified (detection) and the parameters of the targets are estimated. Radar (radio detection and ranging) is commonly used to measure the range or distance from the radar to an object or target. Using position and distance measurement over time allows speed to be measured. Radar also enables measurement of the targets' relative radial velocities, towards or away from the radar, based on the Doppler effect. To localize the radar targets, typically target directions (angles) are also estimated. A four-dimensional (4D) target localization provides the distances, and velocities together with the position, as provided for example by an azimuth $\theta$ and an elevation $\varphi$ angle of the targets. Note that the coordinate system for automotive radar measurements is perpendicular to the vehicle and points towards the wavefront that is reflected from the target. The operation of the radar is described in terms of spherical coordinates with the radar at the center, but any other coordinate system may be used.

The radar stations emit electromagnetic signals, which for a point source at the emitter may be modeled as spherical waves propagating in free space from the point source. In terms of Maxwell equations, the free space is characterized by an absence of charges ($\rho=0$) and currents ($\underline{J}=0$). Based on this, the third and fourth Maxwell's equations can be reduced to a form known as wave equations as in Eq. 7:

$$\nabla^2 \underline{E} - \frac{1}{c^2}\frac{\partial^2}{\partial t^2}\underline{E} = 0, \nabla^2 \underline{B} - \frac{1}{c^2}\frac{\partial^2}{\partial t^2}\underline{B} = 0, \quad \text{Eq. 7}$$

which are second order partial differential equations with the electric field $\underline{E}$ and magnetic field $\underline{B}$. The parameter $c=1/\sqrt{\epsilon\mu}$, determined by the permittivity $\epsilon$ and permeability $\mu$ of the medium, is the speed with which the electromagnetic waves propagate; in air it is equal to the speed of light in vacuum $c_0=299\,792\,458\approx3\cdot10^8$ m/s.

In the far field, i.e. at distances that are far from the point source emitter, electromagnetic waves can be considered as plane waves, i.e. waves for which the surface with equal phases, the wavefront, is a plane. A point source is in the far field of the antenna array, as the distance to the source d is large in relation to the aperture size D. This distance may be defined in Eq. 8.

$$d > \frac{2D^2}{\lambda_c}, \quad \text{Eq. 8}$$

where $\lambda_c=c_0/f_c$ is the wavelength of the signal, with $f_c$ being the carrier frequency. At 77 GHz and for an aperture size D of a few centimeters, the far-field of the antenna array begins at only a few meters from the point source emitter. Thus, for the following description, it will be assumed that the targets are all in the far-field.

When radar signals are modulated, each frequency in the signal bandwidth propagates with its own wavelength, i.e., has a different phase progression. In the case of narrowband signals, however, over the antenna aperture the wavelength of all frequency components in the signal can be approximated by the wavelength of the carrier frequency. Hence, locally, the propagation properties of narrowband signals can be assumed to be modulation independent (narrowband assumption).

In the context of antenna (aperture) size, signals are considered narrowband if their bandwidth is much smaller than the inverse of the time it takes for the wave to pass the entire antenna aperture, i.e., $B \ll c_0/D$. Another way to interpret the narrowband criterion is as a requirement to have $D \ll \Delta R$, where D is the antenna aperture and $\Delta R$ is the range resolution. With $\Delta R=c_0/(2B)$, one obtains $B \ll c_0/(2D)$ which is similar (with a factor of two difference). With this narrowband criterion, one interpretation of the requirement $D \ll \Delta R$ is that a range or distance processing operation sees a target in the same range bin for all of the antennas in the antenna array. For an aperture size of D=7.5 . . . 10 cm, suitable for automotive radar, the narrowband assumption is valid for a bandwidth B=3 . . . 4 GHz. For distance resolutions on the order of 15 cm (for example automotive radar) and bandwidths of up to 1 GHz, the narrowband assumption is suitable for automotive contexts and many others and will be used here.

With the far-field approximation and the narrowband assumption, the third and fourth Maxwell equations can be solved for electric field and plane (sinusoidal) waves. One solution for the electric field is stated in Eq. 9.

$$\underline{E}(\underline{u}, t) = \underline{E}_0 e^{j2\pi\left(f_c t + \frac{\underline{u}^T \underline{p}}{\lambda_c}\right)}, \quad \text{Eq. 9}$$

$$\underline{u} = \begin{bmatrix} u_x \\ u_y \\ u_z \end{bmatrix} = \begin{bmatrix} \sin\theta\cos\phi \\ \sin\theta\sin\phi \\ \cos\theta \end{bmatrix} \quad \text{Eq. 10}$$

is a unit vector perpendicular to the wavefront and pointing in its direction, t is the time, $\underline{p}=[p_x,p_y,p_z]^T$ is a point in space, and $\overline{E}_0$ is the electric field at the origin of the coordinate system. For the electric field and plane waves between two points in space, $\underline{p}_1$ and $\underline{p}_2$, the signal changes only in phase. Consequently, observing the signal at two or more different positions, information about the direction of the wavefront $\underline{u}$ can be obtained. This principle is the basis of array signal processing for DoA estimation.

This principle may be used for PN reduction in embodiments described herein. Since, the PN reduction preserves this direction information by exploiting the fact that there is a plane wave with only a phase difference between two points in space. The direction preservation of the PN reduction may be obtained while reducing the phase noise by initial phase and PN profile estimations and according PN correction techniques when multiple points in space are used for later DoA estimations. In embodiments, the PN reduction preserves the DoA information and reduces the PN. Array signal processing for DoA estimation is therefore described below.

Estimation of DoA for Narrowband Signals and Plane Waves

For measurement of the target directions, the DoA of the reflected electromagnetic waves is estimated. This can be performed by "scanning" all directions based on the assumption that the antenna or the antenna array has a directive radiation pattern, i.e., receives more power from a certain direction. This dominant direction of the radiation pattern may be called the main beam. By pointing the main beam subsequently in each possible direction (beamforming), the DoA with the maximum power can be identified. Assuming a single main beam in the entire range of DoA from where the antenna is able to receive sufficient power (i.e. no ambiguities called grating lobes), the beam with the highest power will point to the DoA of the received signal. The narrower the main beam, the more precise are the DoA estimations that can be performed. As for the beamforming, three possible approaches, depending on how the scanning of DoAs is realized, exist: mechanical, electronic, and digital. State of the art automotive radar uses digital beam forming (DBF), however mechanical or electronic beamforming may alternatively be used.

Figure 5:
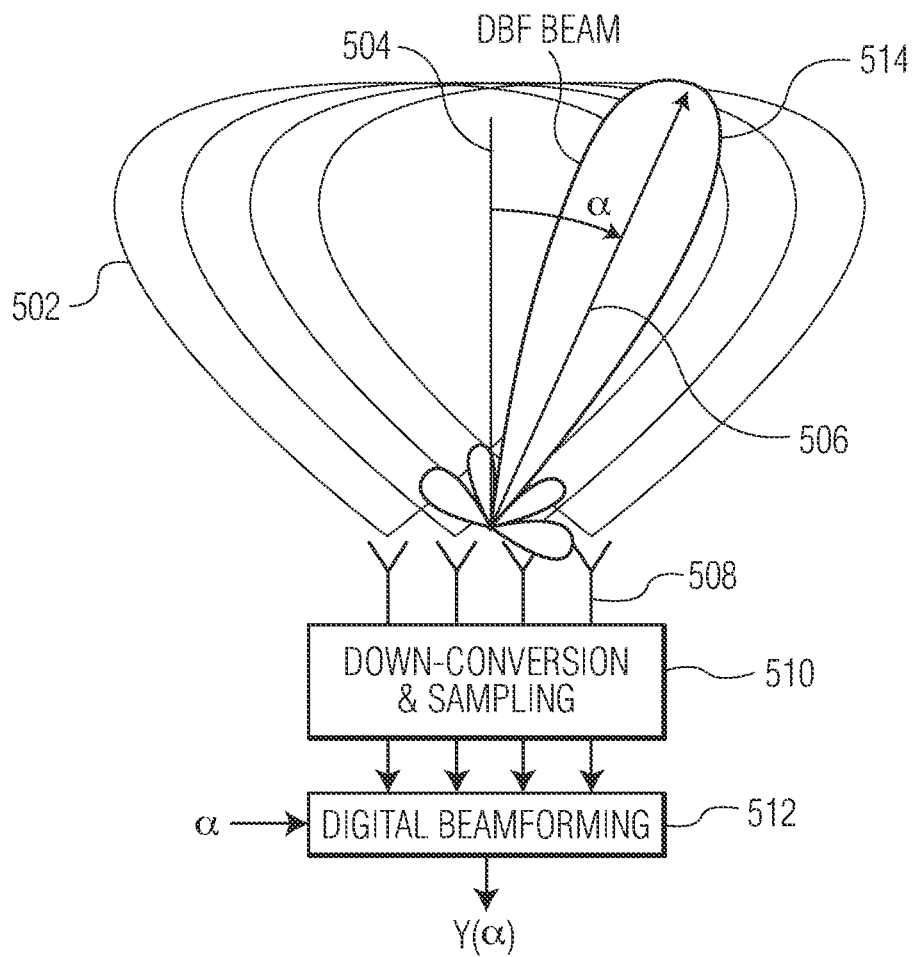
FIG. 5 is a diagram of digital beamforming for a radar station receiver.

FIG. 5 is a diagram of digital beamforming for a wireless radar station receiver. An energy field 502 includes energy reflected from at least one target. A main beam 514 represents the highest energy level in the energy field. A radial reference line 504 extends from a receiving antenna array 508 and is designated, in this example, as zero azimuth and zero elevation. The receiving antenna array is shown as having four equally-spaced antennas for illustration purposes. The main beam 514 has a center along a radial line 506 that is offset from the radial reference line 504 by an angle α. The offset is shown in only one direction, however, the main beam may be offset in both azimuth and elevation and these offsets may be measured for particular uses of the system.

The receiving antenna array 508 receives the main beam 514 and other aspects of the energy field 502 at its antennas. The received energy is applied to down conversion and sampling 510 which may include ADCs. The resulting waveforms are applied to digital beamforming 512 to produce a representation of the main beam. In this example, a denotes the direction of the beam, Y(α) is the resulting power of the beam. There may be a subtle difference between mechanical beamforming and digital beamforming. In a digital system, during reception, the received signals are individually captured at each respective antenna and digitized. As such there is no physical scanning of a beam. With DoA estimation, the different antenna signals are analyzed after reception and the phase differences between the antenna signals are investigated to find the DoA. It might be that, with Doppler-division multiple-access (DDMA) MIMO, different phase values are assigned to the different transmit (Tx) antennas. This will result in a focused beam signal. For each new chirp, these phase values are changed, such that during a system cycle, the beam is scanning the environment.

For DBF, signals from all directions are received simultaneously by multiple receive antennas, i.e., an antenna array. Due to different antenna positions and through the wave propagation, as discussed above, phase differences occur between the signals received at different antennas. These phase differences contain the DoA information.

Denoting the receive (Rx) signal at the origin of the coordinate system by $y_0(t)$, the signals of q-th Rx channel can be written as in Eq. 11.

$$y_q(t) = y_0(t) e^{j2\pi \frac{u^T p_q}{\lambda_c}}, q \in [1, N_{Rx}], \quad \text{Eq. 11}$$

where $\underline{p}_q = [p_{q,x}, p_{q,y}, p_{q,z}]$ denotes the position of the q-th Rx antenna, $N_{Rx}$ is the number of Rx (spatial) channels.

Note that the signals of all Rx antennas are sampled, and the DoA estimation is performed in the digital domain via DBF. For each direction to be scanned (virtually), the received signals are combined with phases that direct the beam digitally in this direction. This corresponds to digitally overlapping the beams of all of the Rx antennas such that, in a certain direction, a narrower beam occurs through constructive interference, whereas, in the other directions, the beams overlap destructively.

Hence, with this approach Rx antennas have a wide radiation pattern that receives sufficient power from all directions of interest. Then, the DoA estimation becomes a frequency estimation problem, where the antennas represent the sampling points and the waves represent complex exponentials in the spatial domain with frequencies determined by their DoA.

Figure 6:
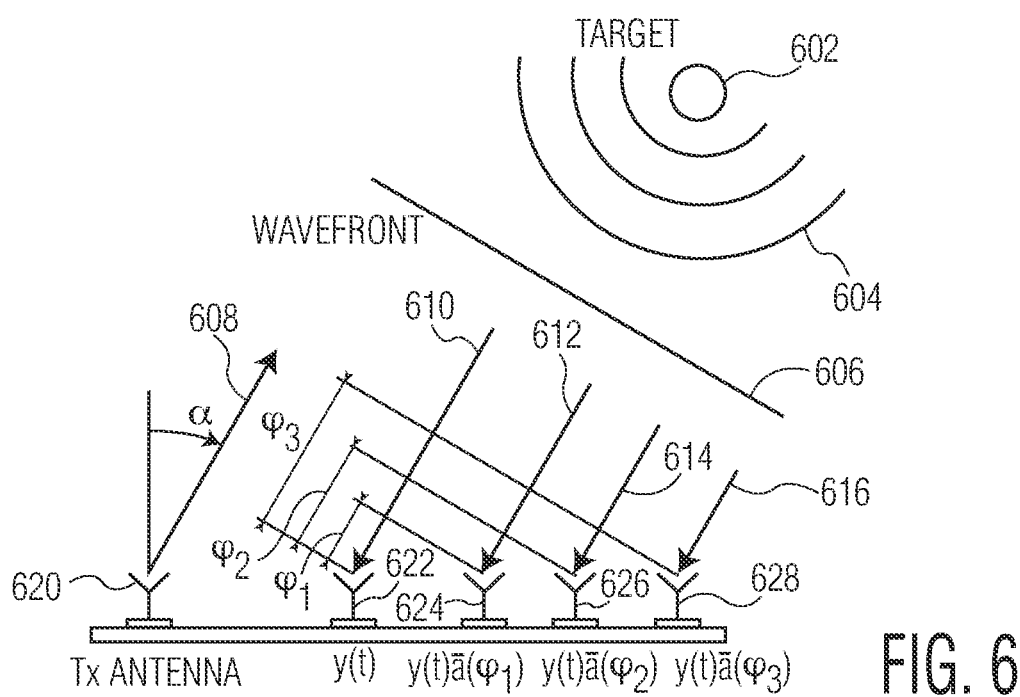
FIG. 6 is a diagram of direction-of-arrival estimation with an antenna array.

FIG. 6 is a diagram of DoA estimation with an antenna array. A Tx antenna 620 emits a beam 608 at an angle α or a widespread beam pattern. The beam strikes a target 602 or object and reflects off the target 602 causing reflection waves 604 that are circular. Due to the distance of the target, the far-field approximation applies and an approximately planar wavefront 606 propagates from the target 602 to antennas 622, 624, 626, 628 of a receive antenna array. The planar wavefront has a DoA indicated by a radial line 610, 612, 614, 616 at each antenna. The planar wavefront 606 arrives at each antenna at a different time which is determined by the AoA.

As shown, α is the target angle, φ denotes the phase difference of the signals at each antenna to that of the first Rx antenna 622, y(t) is the received signal at the first Rx antenna 622, and $\bar{a}$ is the DoA-dependent complex amplitude.

This approach has the advantage of simultaneous acquisition of signals from all directions, but due to multiple Rx channels more hardware is used. This conventional multi-channel DoA estimation based on a single Tx and multiple Rx antennas, i.e. single-input multiple-output (SIMO) system achieves a number of paths equal to the number of Rx antennas, $N_{Rx}$, used. Each single path from a Tx antenna to the target and back to an Rx antenna is called a spatial channel.

Phase Noise Reduction with Initial Phase Estimation

PN reduction is described herein within a mathematical model based on two asymmetric linear antenna arrays each having $N_{Rx}$ spatial channels. This mathematical model is given for line-of-sight (LoS) operation with two radar stations. The radar stations' time bases are defined by their respective local oscillators (LOs). All operations such as the start of an FMCW chirp, frequency increment, and ADC timing rely on this time base. The first radio unit, or radar station 1, LO, S1 and the second radio unit, or radar station 2, LO, S2, clock frequencies differ, because the stations are not physically linked. Local time increments generated by the LOs define the respective intra-chirp time (often referred to as "fast time") as the mean of the local time in each station. Nevertheless, the mathematical model assumes that the time and frequency changes within the intra-chirp time (fast-time) as well as within the inter-chirp time (slow-time) are corrected and can be neglected.

A mathematical model stated in Eq. 12, for the mixed signals with full duplex transmission shows that the phase of the individual chirp for the first radar station, also referred to as station 1, $\Phi_{1k}(t)$, with a relative drift in time, $\delta_t$, between the two stations, a timing offset $\Delta\tau_{1k}$, a frequency offset $\Delta f$ between the two stations, and the RF bandwidth B becomes:

$$\Phi_{1k}(t) = 2\pi\left(f_c + \frac{\Delta f}{2} - \frac{B}{2}\right)\left(1 + \frac{\delta_t}{2}\right)t + \quad \text{Eq. 12}$$

$$2\pi\mu\left(\frac{\left(1 + \frac{\delta_t}{2}\right)^2}{2}t^2 + \Delta\tau_{1k}\left(1 + \frac{\delta_t}{2}\right)t\right) + \Psi_{1k}\left(\left(1 + \frac{\delta_t}{2}\right)t\right) + \Theta_{1k}$$

where $$\mu = \frac{B}{T_{sw}}$$

is the chirp-rate (chirp-slope), $T_{sw}$ is the sweep time, i.e., the chirp duration, $k \in \{0, \ldots, K-1\}$ indicates the FMCW chirp number in which K chirps are transmitted and received, $\Psi_{1k}(t)$ is the PN, and $\Theta_{1k}$ represents an arbitrary initial phase. For station 2 a similar mathematical model holds only with a sign reversal for the frequency offset and the relative drift in time.

With the above mathematical model of Eq. 12 and some thorough manipulations, transmitted chirps may be defined as in Eq. 13 where $$s_{1k,tx}(t) = A_1 \exp\{j\Phi_{1k}(t)\}, \quad \text{Eq. 13}$$
$$s_{2k,tx}(t) = A_2 \exp\{j\Phi_{2k}(t)\}$$

are transmitted and serve as references or own-conversion with $A_1$ an $A_2$ denoting the chirp signal amplitudes. Hence, the signals received at the opposite station over the time-dependent wireless channel with propagation time $\tau_k$, Doppler frequency shift $f_D$, and attenuation coefficient $\alpha$ become receive chirps as defined in Eq. 14.

$$s_{2k,rx}(t) = \alpha A_1 \exp\{j\Phi_{1k}(t-\tau_k)\}\exp\{j2\pi f_D t\}, \quad \text{Eq. 14}$$
$$s_{1k,rx}(t) = \alpha A_2 \exp\{j\Phi_{2k}(t-\tau_k)\}\exp\{j2\pi f_D t\}$$

On this basis, the mixed signal of station 1 can be as given in Eq. 15, $$s_{1k,mix}(t) = s_{1k,tx}(t)(s_{1k,rx}(t))^* = A\exp \quad \text{Eq. 15}$$

$$\left\{j\left(2\pi\left((\delta_f - f_D)t + \left(f_c - \frac{B}{2}\right)\tau_k + \mu((\tau_0 + \Delta\tau + \delta_t kT_{sw})t + \delta_t t^2)\right) + \right.\right.$$
$$\left.\left. \Theta_{1k} - \Theta_{2k} + \Psi_{1k}\left(\left(1 + \frac{\delta_t}{2}\right)t\right) - \Psi_{2k}\left(\left(1 - \frac{\delta_t}{2}\right)(t-\tau_k)\right)\right)\right\}$$

where A is the signal amplitude, $$\delta_f = \Delta f + \delta_t\left(f_c - \frac{B}{2}\right)$$

is the total frequency offset, and with the ToF modeled as $\tau_k = \tau_0 + \tau_k'$ where $\tau_0$ and $\tau_k'$ are the initial ToF and the propagation time change in the wireless channel, respectively. Note that for station 2 a similar mathematical model holds only with a sign reversal for the Doppler frequency shift, the initial ToF, and for the PN the interchange of the ToF $\tau_k$ between station 1 and station 2.

For the bistatic or monostatic system addressed herein, the ADCs in both radar stations are controlled by their respective internal clock sources. Therefore, the mixing products of one radar unit or radar station are not available as sampled data at the other radar unit or radar station. Sampling in radar stations 1 and 2 is delayed by $\Delta\tau_{1k}$ and $\Delta\tau_{2k}$, respectively. That allow the FMCW beat signals $s_{1k,beat}(t)$ and $s_{2k,beat}(t)$ to be expressed as a time delayed version of both mixed signals.

Phase Noise Reduction Technique with Preservation of Direction Information

First, a state-of-the-art approach based on the previously discussed mathematical model based on Eq. 12 is addressed. As both beat signals, described above, are only available as sampled signals, a discrete Fourier transform may be used. Since unknown parameters can be derived via discretized or continuous signals if the Nyquist sampling criterion holds, all computational steps are described with continuous time signals. FMCW chirps are of limited duration $t < \tau_w$ in fast time. Therefore, a suitable window function w(t) might be multiplied with the time domain signals to reduce the sidelobe level in the frequency domain.

Models for Radar Signals

For the mathematical model in continuous time, the Fourier transform $\mathcal{F}\{\bullet\}$, after windowing, of the beat signals for station 1 and station 2 are calculated as shown in Eq. 16.

$$s_{1k,beat} = \mathcal{F}\{w(t)s_{1k,beat}(t)\} = \quad \text{Eq. 16}$$
$$A[\delta\{f - ((\delta_f - f_D) + \mu(\tau_0 + \Delta\tau + \delta_t kT_{sw}))\} * \mathcal{F}\{w(t)\exp\{j2\pi\mu\delta_t t^2\}\} *$$
$$\mathcal{F}\{\exp\{j\Psi_{pn,1k}(t)\}\}\cdot \exp\{j\gamma_{1k}\}\cdot\exp\left\{j\left(2\pi\left(f_c - \frac{B}{2}\right)\tau_k + \Theta_{1k} - \Theta_{2k}\right)\right\}$$

$$s_{2k,beat}(f) = A[\delta\{f - ((\delta_f + f_D) + \mu(-\tau_0 + \Delta\tau + \delta_t kT_{sw}))\} *$$
$$\mathcal{F}\{w(t)\exp\{j2\pi\mu\delta_t t^2\}\} * \mathcal{F}\{\exp\{j\Psi_{pn,2k}(t)\}\}\cdot\exp\{j\gamma_{2k}\}\cdot$$
$$\exp\left\{j\left(-2\pi\left(f_c - \frac{B}{2}\right)\tau_k + \Theta_{1k} - \Theta_{2k}\right)\right\}$$

where $\Psi_{pn,1k}(t) = \Psi_{1k}\left(\left(1 + \frac{\delta_t}{2}\right)t\right) - \Psi_{2k}\left(\left(1 - \frac{\delta_t}{2}\right)(t-\tau_k)\right),$ $\Psi_{pn,2k}(t) = \Psi_{1k}\left(\left(1 + \frac{\delta_t}{2}\right)(t-\tau_k)\right) - \Psi_{2k}\left(\left(1 - \frac{\delta_t}{2}\right)t\right),$ and $\{\gamma_{1k}, \gamma_{2k}\}$ the phase shifts caused by the delays of the ADCs. In Eq. 16, $\{\Psi_{pn,1k}(t), \Psi_{pn,2k}(t)\}$ has negligible influence on the peak position. Hence, it can be approximated by $\{\mathcal{F}\{\exp\{j\Psi_{pn,1k}(t)\}\} \approx \delta(f), \mathcal{F}\{\exp\{j\Psi_{pn,2k}(t)\}\} \approx \delta(f)\}$ to estimate the unknown parameters. The corresponding beat signals may be modelled by employing a relative time base, which depends on a timing offset $\Delta\tau$ and a local oscillator (LO) drift $\delta_t$.

Now without loss of generality and to simplify Eq. 16, the local oscillators are adjusted to the same frequency, i.e., $\delta_t \approx 0$. Furthermore, the wireless channel is reciprocal and allows identical signal transmission in both directions. Then the Fourier transform of the intermediate frequency (IF) beat signals can be given as in Eq. 17

$$s_{1k,beat}(f) = AW\{f - (\Delta f + \mu(\Delta\tau + \tau_0) - f_D)\} * \qquad \text{Eq. 17}$$
$$\mathcal{F}\{\exp\{j\Psi_{pn,1k}(t)\}\}\exp\{j2\pi f_c\tau_k\}\cdot\exp\{j(\varphi_{1k} - \varphi_{2k} + \gamma(\Delta\tau, \delta_t))\}$$
$$s_{2k,beat}(f) = AW\{f - (\Delta f + \mu(\Delta\tau - \tau_0) + f_D)\} *$$
$$\mathcal{F}\{\exp\{j\Psi_{pn,2k}(t)\}\}\exp\{-j2\pi f_c\tau_k\}\cdot\exp\{j(\varphi_{1k} - \varphi_{2k} + \gamma_{2k}(\Delta\tau, \delta_t))\}$$

These beat spectra of both radar stations are centered around the frequency $f_{shift}=\Delta f+\mu\Delta\tau$. This shift is determined to account for the unknown trigger timing offset, which depends on the internal delay and the trigger cable length. The beat spectra of station 2 are mirrored at $f_{shift}$, and the complex conjugate is calculated. After removing the offset caused by the frequency shift, targets appear at the same position in both corrected beat signals, and the desired phase information as a function of $\tau_k$ is identical. Due to defined timing, the additional phase shift values $\{\gamma_{1k}(\Delta\tau,\delta_t),\gamma_{2k}(\Delta\tau,\delta_t)\}$ are constant and can be removed via calibration. Thereafter, the bistatic beat signals may be defined as in Eq. 18.

$$s_{1k,beat}(f) = \qquad \text{Eq. 18}$$
$$AW\{f - \mu\tau_0 + f_D\} * \mathcal{F}\{\exp\{j\Psi_{pn,1k}(t)\}\}\exp\{j(2\pi f_c\tau_k + \psi_k)\}$$
$$s_{2k,beat}(f) =$$
$$AW\{f - \mu\tau_0 + f_D\} * \mathcal{F}\{\exp\{-j\Psi_{pn,2k}(t)\}\}\exp\{j(2\pi f_c\tau_k - \psi_k)\}$$

The definitions of Eq 18 are simplified, where $\psi_k$ expresses the un known initial phase of the FMCW chirps after calibration. To enable coherent measurements, the unknown phases and PN along the fast-time dimension may be compensated for.

Unlike radar localization with single channel sensors and line-of-sight (LoS) transmission, all targets are considered to improve the signal-to-noise ratio (SNR) of the received signals. For the bistatic PN, it can be assumed that the influence of $\{\Psi_{pn,1k}(t),\Psi_{pn,2k}(t)\}$ is comparable, sufficiently small, and independent of the ToF, which can be satisfied using signal sources with high phase stability.

Now, assuming a radar scene with L different targets labeled as $l \in \{1, \ldots, L\}$, the bistatic signals are given as in Eq. 19, $$s_{1k,beat}(f) \approx \exp\{j\psi_k\}\cdot\mathcal{F}\{\exp\{j\Psi_{pn,k}(t)\}\} * \qquad \text{Eq. 19}$$
$$\sum_{l=1}^{L} A_l\exp\{j(2\pi f_c\tau_{k,l})\}W\{f - \mu\tau_{0,l} + f_{D,l}\} \approx \exp\{j\psi_k\}\cdot S_{k,0}(f)$$
$$s_{2k,beat}(f) \approx \exp\{-j\psi_k\}\cdot\mathcal{F}\{\exp\{-j\Psi_{pn,k}(t)\}\} *$$
$$\sum_{l=1}^{L} A_l\exp\{j(2\pi f_c\tau_{k,l})\}W\{f - \mu\tau_{0,l} + f_{D,l}\} \approx \exp\{-j\psi_k\}\cdot S_{k,0}(f)$$

where the target information $S_{k,0}(f)$ is equal in both directions of transmission. To estimate $\psi_k$, the integral of Eq. 20

$$\hat{\psi}_k = \frac{1}{2}\arg\left\{\int_0^{f_{max}} s_{1k,beat}(f)(s_{2k,beat}(f))^* df\right\} \qquad \text{Eq. 20}$$
$$= \frac{1}{2}\arg\{\exp\{j2\psi_k\}\}\cdot\int_0^{f_{max}} |S_{k,0}(f)|^2 df = \psi_k + \Phi_k$$

is evaluated, where the operator $\arg\{\bullet\}$ and the variable $f_{max}$ denote the angle of a complex value and the upper detectable beat frequency, respectively. The random $\Phi^k \in \{0,\pi\}$ accounts for the factor ½ and can be corrected via phase unwrapping along the slow time dimension.

Especially when observing targets with high radar cross sections (RCSs), phase noise compensation in the fast-time dimension is advantageous. In this case, the remaining PN profile becomes visible and might mask weak targets. Moreover, ranging accuracy is reduced by PN. An estimation in the fast-time dimension, as in Eq. 21, $$\hat{\Psi}_{pn,k}(t) = \frac{1}{2}\arg\{s_{1k,beat}(t)(s_{2k,beat}(t))^*\exp\{-j2\hat{\psi}_k\}\} \qquad \text{Eq. 21}$$
$$= \frac{1}{2}\arg\{\exp\{j2\Psi_{pn,k}(t)\}\cdot|s_{k,0}(t)|^2\}$$

after correction of the initial phases delivers the phase noise profile for each FMCW chirp. The corresponding time domain beat signals with the target information $s_{k,0}(t)$ are defined as $\{s_{1k,beat}(t),s_{2k,beat}(t)\}$. As the initial phases and the PN profile are equal for all TX and RX combinations, a correction may be applied to all received bistatic signals. Both estimated phase errors; $\hat{\psi}_k, \hat{\Psi}_{pn,k}(t)$ can therefore be used for compensation via multiplication with the conjugated values as shown in Eq. 22

$$\hat{s}_{1k,beat}(t) = s_{1k,beat}(t)\exp\{-j(\hat{\psi}_k + \hat{\Psi}_{pn,k}(t))\} \qquad \text{Eq. 22}$$
$$\hat{s}_{2k,beat}(t) = 2_{2k,beat}(t)\exp\{+j(\hat{\psi}_k + \hat{\Psi}_{pn,k}(t))\}$$

This enables fully coherent operation with separated antenna arrays (such as with the first radar station 102 and the second radar station 104).

Figure 7:
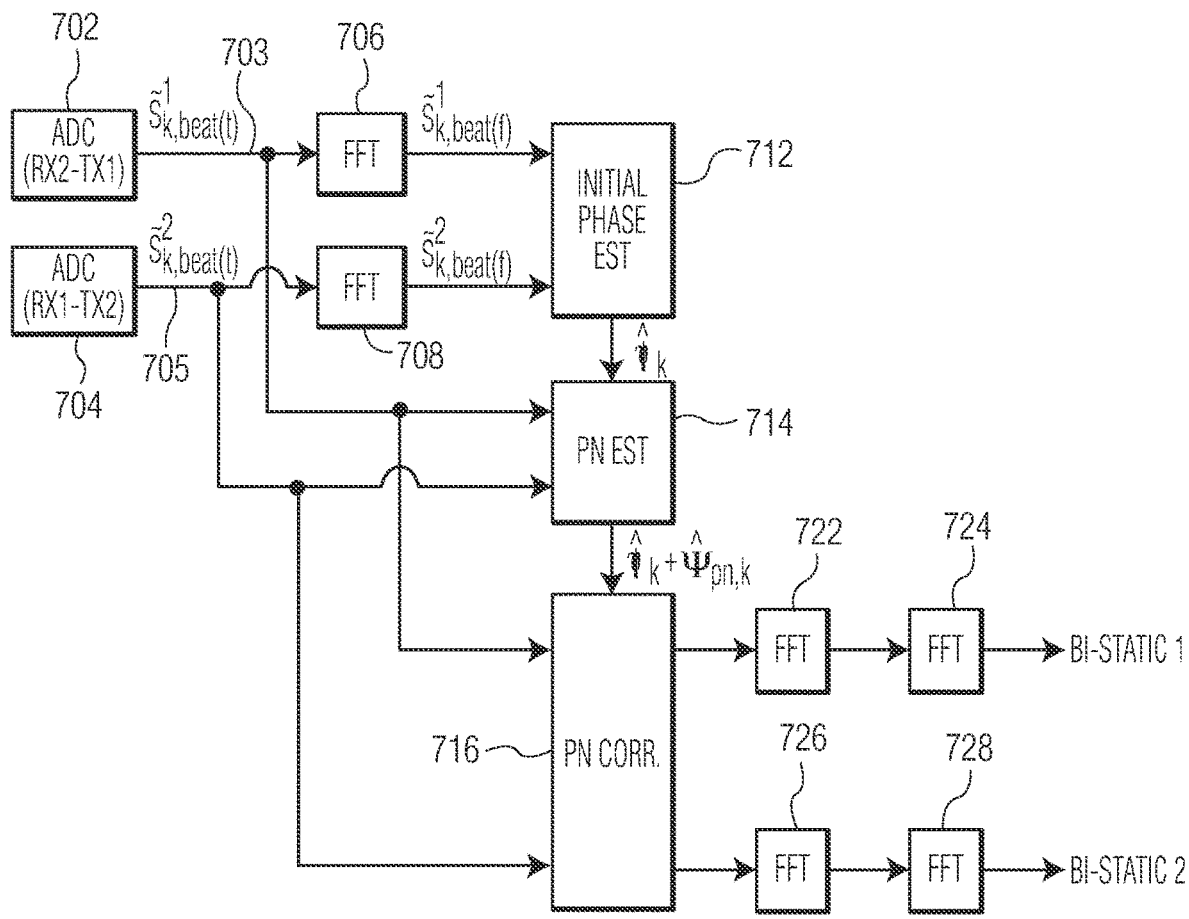
FIG. 7 is a block diagram of a compensation procedure on bistatic signals with estimates of the initial phases and the phase noise (PN) profile.

FIG. 7 is a block diagram of a compensation procedure on bistatic signals with estimates of the initial phases and the PN profile. A first beat signal 703 is generated as a digitized signal by a first ADC 702. The first beat signal is based on a comparison of a radar signal transmitted by a first transmitter TX1 and received, after reflection, at a second receiver RX2. A second beat signal 705 is generated as a digitized signal by a second ADC 704 based on a comparison of a radar signal transmitted by a second transmitter TX2 and received by a first receiver RX1. The first receiver and the first transmitter may have the same antenna or a different antenna. The first transmitter and the second receiver are located in different positions and in embodiments do not have the same clock source. The first beat signal 703 and the second beat signal 705 correspond to the beat signal described in Eq. 22.

The first beat signal 703 and the second beat signal 705 are applied to a respective first FFT 706 and second FFT 708 to generate frequency domain versions of the first beat signal 703 and the second beat signal 705. The frequency domain versions are provided to an initial phase estimation 712 that generates an initial phase estimate $\check{\psi}_k$, as described in Eq. 20.

The first beat signal 703 and the second beat signal 705 are applied as time-domain signals to a PN estimation 714 together with the initial phase estimation 712 output $\check{\psi}_k$, to generate a PN estimate $\hat{\Psi}_{pn,k}$, as described in Eq. 21. The initial phase estimation and the PN estimation are combined and provided to a PN correction 716. The PN correction 716 receives the first beat signal 703 and the second beat signal 705 in the time domain and applies a PN correction to generate corrected beat signals. Each corrected beat signal is applied to an FFT chain 722, 724, 726, 728 to generate corrected radar output for further processing (not shown).

Figure 8:
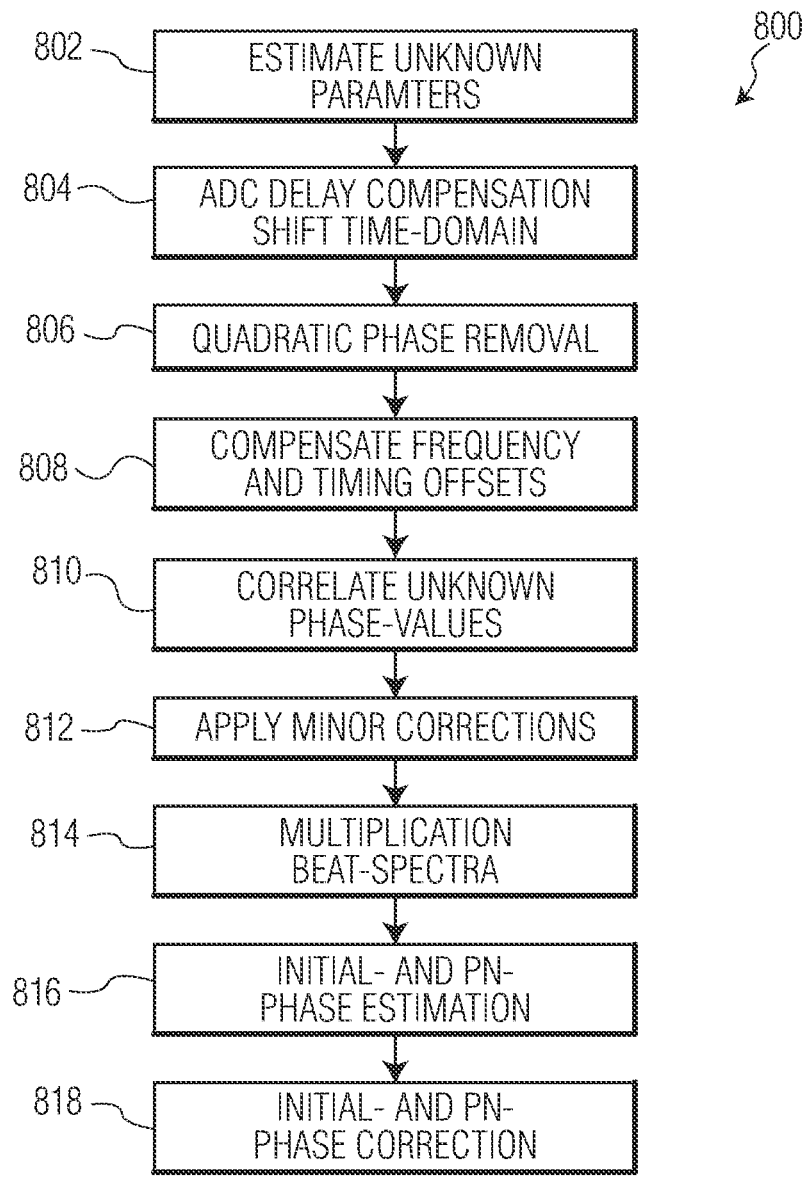
FIG. 8 is a flow chart 800 of a process of PN phase correction.

FIG. 8 is a flow chart 800 of a process of PN phase correction for the structure of FIG. 7 and as described above. The process begins at 802 with estimating unknown parameters. These are initial conditions upon which the process will operate. Using these unknown parameters, an ADC delay compensation shift is made using signals in the time domain at 804. At 806, quadratic phase is removed. At 808 the frequency and timing offsets between the two stations are compensated. At 810 unknown phase values are correlated and 812 minor corrections from the frequency and timing offsets are applied. At 814 there is a beat spectra multiplication that then leads to an initial phase and PN phase estimation at 816. With these estimates an initial phase correction and a phase noise correction are applied at 818.

This mathematical model, as described above, for preserving direction information uses an overlapping (virtual) antenna for the bistatic signals. This approach, of the overlapping antenna, is described in more detail below.

Phase Noise Reduction for Antenna Arrays with an Overlapping Antenna

In embodiments herein, a multiplication of the time domain beat signal of station 1 with the complex conjugate of the time domain beat signal of station 2 is used to estimate the PN. This compares to using the multiplication to synthesize a bistatic based beat signal, i.e., the non-linear multiplication is not resulting in a beat signal but rather a correction term for each TX-RX combination, i.e., spatial channel. Moreover, as already discussed, the beat signal of each spatial channel can be used to obtain direction information since its phase depends on the position represented by its array configuration.

Figure 9:
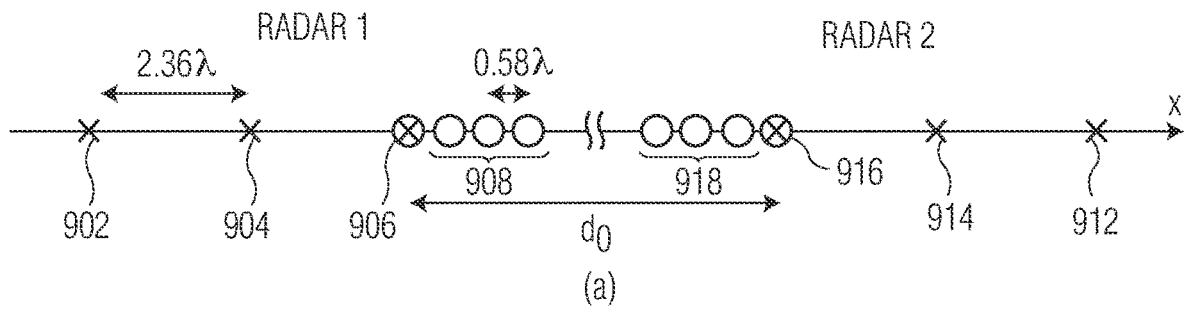
FIG. 9 is a diagram of two different linear antenna arrays with a shared virtual central antenna.
Figure 9:
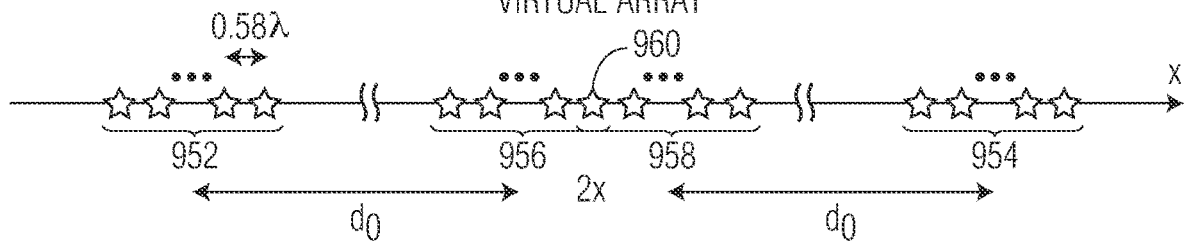

FIG. 9 is a diagram of two different linear antenna arrays with a shared virtual central antenna. The top line shows a physical antenna configuration with three physical transmit antennas 902, 904, 906 on a left side antenna array for radar station 1 and three physical transmit antennas 912, 914, 916 on a right-side antenna array for radar station 2. The antennas of each linear antenna array are separated by a distance of 2.36λ and the nearest receive antennas of the two antenna arrays are separated by a predetermined fixed distance, $d_0$ that is known and used in the analysis below. Radar station 1 also has four receive antennas 908 each separated by 0.58λ. Radar station 2 has a similar array of four receive antennas 918 each separated by 0.58λ, where λ refers to the wavelength.

The bottom line in FIG. 9 shows a virtual array that can be derived using the three transmitters and four receivers of each of the two radar stations, radar station 1 and radar station 2. Radar station 1 has twelve monostatic virtual antennas 952 at the left end of the linear array. Radar station 2 has twelve monostatic virtual antennas 954 at the right end of the linear array. In the center, a left-side virtual array 956 of twelve bistatic virtual antennas that are formed by signals received by radar station 1 that are transmitted by radar station 2. A right-side virtual array 958 of twelve bistatic virtual antennas are formed by signals received by radar station 2 that are transmitted by radar station 1. In the linear array configuration for the bistatic signal, the left-side virtual array 956 receives the bistatic beat signal $s_{1k,beat}(f)$ from radar station 1, and the right-side virtual array 958 receives the bistatic beat signal $s_{2k,beat}(f)$ from radar station 2.

However, this array-configuration is a very specific configuration, especially regarding the bistatic signal, i.e., the virtual array. It can be seen from FIG. 9 that for the bistatic signals there are two overlapping antennas 960. This is obtained by the choice of the physical antenna of the antenna array in the top line for radar station 1 and radar station 2 in such a way that both the first antenna of the left-side virtual array 956 for the first bistatic signal and the first antenna of the right-side virtual array 958 for the second bistatic signal coincide, i.e., their distance is zero, or d=0. This also results in the fact that the total aperture is smaller or, equivalently, that the number of available antennas is decreased by one.

Moreover, using the above-described mathematical framework, the beat signals for each spatial channel of the array configuration shown in FIG. 9 can be written as shown in Eq. 23 and Eq. 24 in which;

$$\check{s}_{1k,beat}(f) \triangleq \exp\{j(\psi_k + \phi_d)\} \cdot S_{k,0}(f) \qquad \text{Eq. 23}$$

$$\check{s}_{2k,beat}(f) \triangleq \exp\{-j(\psi_k + \phi_d)\} \cdot S_{k,0}(f)$$

with $$\phi_d \stackrel{def}{=} 2\pi \frac{d}{\lambda_c} \sin\theta \qquad \text{Eq. 24}$$

Representing the linear phase rotation of a spatial channel with a uniform linear array antenna distance d, a narrowband plane wave carrier wavelength λe, and a direction angle of the plane wave with respect to the orientation of the uniform linear array θ.

Applying a state-of-the-art estimation and correction procedure gives Eq. 25 for the initial phase estimation:

$$\check{\psi}_k = \frac{1}{2}\arg\left\{\int_0^{f_{max}} \check{s}_{1k,beat}(f)\left(\check{s}_{2k,beat}(f)\right)^* df\right\} = \qquad \text{Eq. 25}$$

$$\frac{1}{2}\arg\{\exp\{j2(\psi_k + \phi_d)\}\} \cdot \int_0^{f_{max}} |S_{k,0}(f)|^2 df = (\psi_k + \phi_d) + \Phi_k$$

Hence, the direction information will become part of the initial phase and will be removed by the initial phase correction, as discussed above. This is problematic since this direction information is used for DoA estimation of the targets later on.

However, thanks to the two overlapping antenna 960 of the linear array, the distance between two antennas is actually set to zero, i.e., d=0, and will result in the fact that $\phi_d=0$, as can be seen above. This, consequently, results in that the direction angle $\phi_d$ is not taken into account in the initial phase estimation $\check{\psi}_k$ and will be preserved. Thus, this phase estimation and correction approach preserves the direction information, $\phi_d$. It relies on the overlap of the position of one antenna of the two uniform linear antenna arrays with dimensions as shown in FIG. 9. This seriously limits flexibility in the array configuration and decreases the maximum allowable antenna aperture resulting in a lower DoA resolution. In other words, if the two linear arrays are moved farther apart, then there will be no overlapping virtual antenna, however a greater distance between a transmitter and receiver of a bistatic system provides a wider rangefinder base for DoA or AoA estimation.

Phase Noise Reduction with Direction Information Preservation

Figure 10:
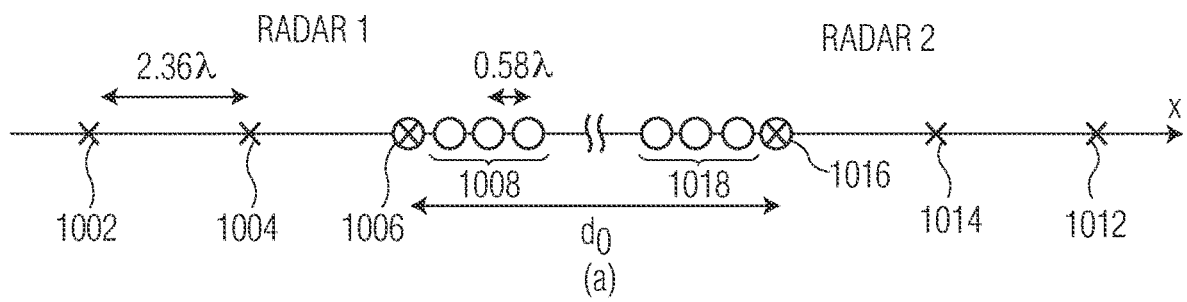
FIG. 10 is a diagram of two different linear antenna arrays with no shared central virtual antenna.
Figure 10:
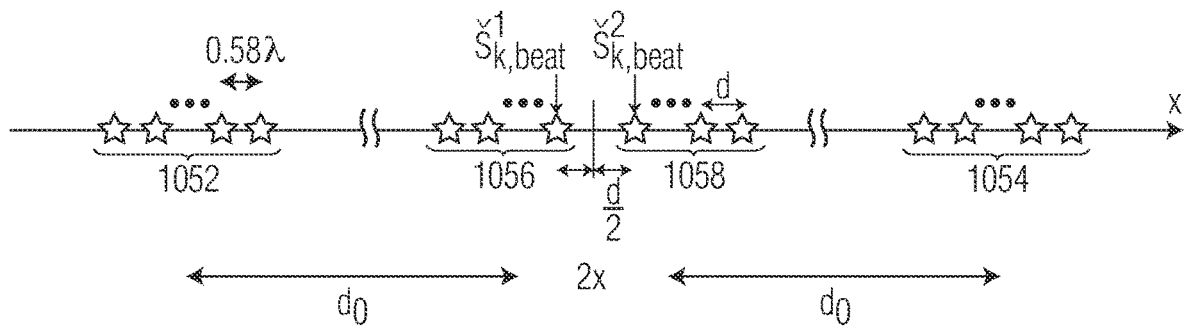

The overlapping virtual antenna may be avoided with a d/2-uniform linear virtual array. In such a configuration, the overlapping virtual antennas are shifted a part from each other by a distance d as shown by FIG. 10. The initial phase estimation and a PN profile estimation may be made using this uniform array without an overlapping antenna.

FIG. 10 is a diagram of two different linear antenna arrays with no shared central virtual antenna. The top line shows a physical antenna configuration with three physical transmit antennas 1002, 1004, 1006 on a left side antenna array for radar station 1 and three physical transmit antennas 1012, 1014, 1016 on a right-side antenna array for radar station 2. The antennas of each array are separated by a distance of 2.36λ and the nearest receive antennas of the two antenna arrays are separated by a distance $d_0$. Radar station 1 also has four receive antennas 1008 each separated by 0.58λ. Radar station 2 has a similar array 1018 of four receive antennas each separated by 0.58λ, where λ refers to the wavelength.

The bottom line in FIG. 10 shows a virtual array that can be derived using the three transmitters and four receivers of each of the two radar stations, radar station 1 and radar station 2. Radar station 1 has twelve monostatic virtual antennas 1052 at the left end of the linear array. Radar station 2 has twelve monostatic virtual antennas 1054 at the right end of the linear array. In the center, a left-side virtual array 1056 of twelve bistatic virtual antennas is formed by signals received by radar station 1 that are transmitted by radar station 2. A right-side virtual array 1058 of twelve bistatic virtual antennas is formed by signals received by radar station 2 that are transmitted by radar station 1.

This implies that the zero point, i.e., origin, is in the middle of this uniform linear array. Note, that the linear array consists of two asymmetric linear arrays, one belonging to the bistatic signal at the left-side virtual array 1056 of bistatic antennas from radar station 1 and one belonging to the bistatic signal at the right-side virtual array 1058 of the virtual bistatic antennas from radar station 2 with according bistatic beat signals $\{\check{S}_{k,beat}^1(f), \check{S}_{k,beat}^2(f)\}$ given by Eq. 26.

$$\check{S}_{k,beat}^1(f) \approx \exp\{+j(\psi_k + \varphi_{d/2})\} \cdot S_{k,0}(f)$$

$$\check{S}_{k,beat}^2(f) \approx \exp\{-j(\psi_k + \varphi_{d/2})\} \cdot S_{k,0}(f)$$

Eq. 26

Superscripts and capital letters are used herein to indicate the bistatic signals in embodiments herein.

Radar Stations with the Same Direction Information

Since the configuration is linear, in this example specifically a uniform linear array configuration, the distance between the array antennas, i.e., sensors, is equal to d with a linear phase rotation between the antennas of $\phi_d$, which is two times larger than the phase difference between antennas that are d/2 apart, given by Eq. 27.

$$\phi_{d/2} \stackrel{def}{=} 2\pi \frac{d/2}{\lambda_c}\sin\theta \Rightarrow 2\phi_{d/2} = 2\left(2\pi\frac{d/2}{\lambda_c}\sin\theta\right) = \phi_d$$

Eq. 27

In the described PN reduction apparatus and technique the asymmetry of the linear arrays is used to preserve direction information through the PN reduction technique. The existence of the distance relationship of the antennas in the two asymmetric linear arrays allows for assumptions that avoid the use of the overlapping antenna. Due to the asymmetric linear antenna array the narrowband assumption and plane wave approximation described above also apply.

Hence, for the described PN reduction apparatus and technique a composite plane wave approach may be used, i.e., in this approach, by virtue of the linear antenna array assumption a composite plane wave with a composite angle-of-direction is given by Eq. 28.

$$Y_{k,0}(f) = [X_{1,k}(f) + \ldots + X_{L,k}(f)]$$

Eq. 28 of the multiple target signals $\{x_{1,k}(t), \ldots, x_{L,k}(t)\}$, with beat signals as defined in Eq. 29, $$\check{S}_{k,beat}^1(f) \approx \exp\{j(\psi_k)\} Y_{k,0}^1(f)$$

$$\check{S}_{k,beat}^2(f) \approx \exp\{-j(\psi_k)\} Y_{k,0}^2(f)$$

Eq. 29 where $$Y_{k,0}^1(f) \stackrel{def}{=}$$

$$\exp\left\{j\left(\left(\frac{d}{2}\right)k_{1,c}(f)\right)\right\} \cdot Y_{k,0}(f) \text{ with } k_{1,c}(f) = \frac{2\pi}{\lambda}\sin(\theta_{1,d}(f))$$

$$\varphi_{1,d/2}(f) \stackrel{def}{=} \left(\frac{d}{2}\right)k_{1,c}(f) \Rightarrow 2\varphi_{1,d/2}(f) = dk_{1,c}(f) = \varphi_{1,d}(f)$$

$$Y_{k,0}^2(f) \stackrel{def}{=}$$

$$\exp\left\{-j\left(\left(\frac{d}{2}\right)k_{2,c}(f)\right)\right\} \cdot Y_{k,0}(f) \text{ with } k_{2,c}(f) = \frac{2\pi}{\lambda}\sin(\theta_{2,d}(f))$$

$$\varphi_{2,d/2}(f) \stackrel{def}{=} \left(\frac{d}{2}\right)k_{2,c}(f) \Rightarrow 2\varphi_{2,d/2}(f) = dk_{2,c}(f) = \varphi_{2,d}(f)$$

Eq. 30

This direction information is preserved with the described PN reduction apparatus and technique. This may be performed in two steps firstly with the same direction information, i.e., $\varphi_{1,d/2}(f) = \varphi_{2,d/2}(f) = \varphi_{d/2}(f)$ and secondly, in the next section, for direction information $\{\varphi_{1,d/2}(f), \varphi_{2,d/2}(f)\}$. An assumption is used that DoA estimation is dependent on the beat frequency. This may be for the more general case where there is a distance $d_1$ between the two bistatic antenna arrays and a distance of $d_2$ between the two rightmost antennas from the left bistatic antenna array and between the two leftmost antennas of the right bistatic antenna array.

Figure 11:
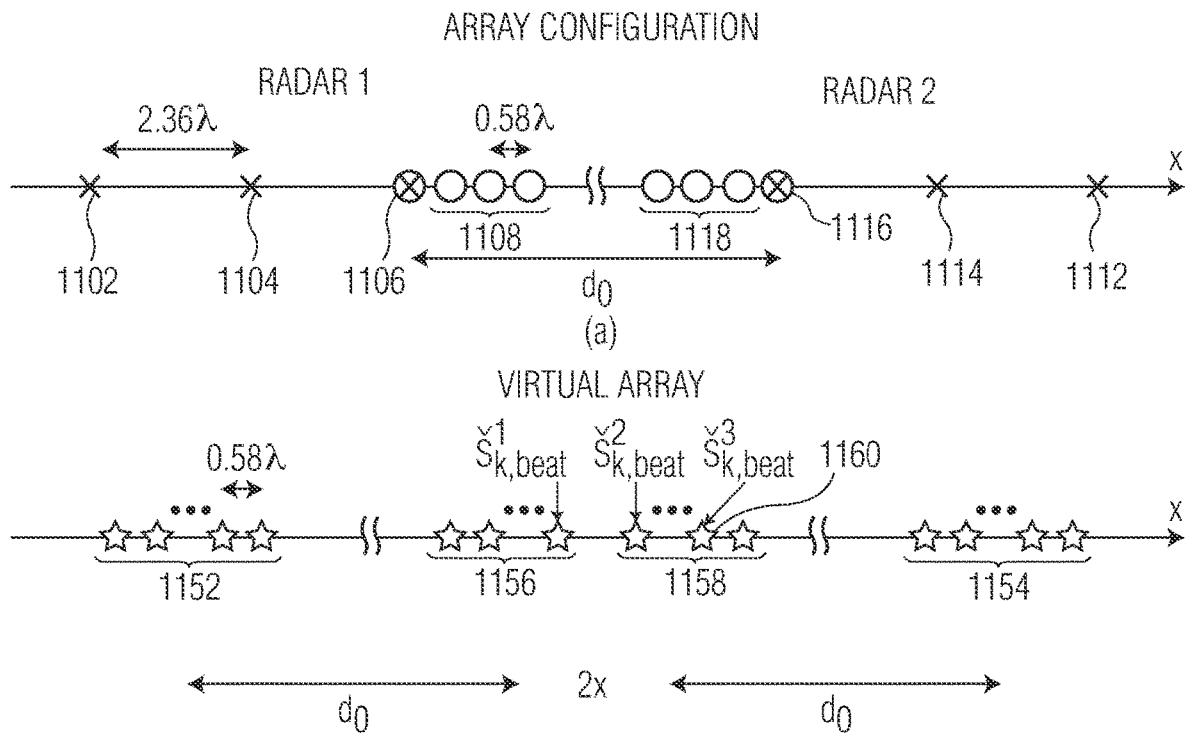
FIG. 11 is a diagram of two different linear antenna arrays with no shared central antenna and a third bistatic beat signal for PN reduction.

For preserving $\varphi_{d/2}(f)$ an extra beat signal is introduced for the spatial channel at the −3d/2 antenna of the virtual linear antenna array of radar station 2, i.e., the right second antenna in FIG. 11.

FIG. 11 is a diagram of two different linear antenna arrays with no shared central antenna and a third bistatic beat signal for PN reduction. The top line shows a physical antenna configuration with three physical transmit antennas 1102, 1104, 1106 on a left side antenna array for radar station 1 and three physical transmit antennas 1112, 1114, 1116 on a right-side antenna array for radar station 2. The antennas of each array are separated by a distance of 2.36) and the nearest receive antennas of the two antenna arrays are separated by a distance $d_0$. Radar station 1 also has four receivers 1108 each separated by 0.58λ. Radar station 2 has a similar array 1118 of four receivers each separated by 0.58λ, where λ refers to the carrier frequency.

The bottom line in FIG. 11 shows a virtual array that can be derived using the three transmitters and four receivers of each of the two radar stations, radar station 1 and radar station 2. Radar station 1 has twelve monostatic virtual antennas 1152 at the left end of the linear array. Radar station 2 has twelve monostatic virtual antennas 1154 at the right end of the linear array. In the center, a left-side virtual array 1156 of twelve bistatic virtual antennas is formed by signals received by radar station 1 that are transmitted by radar station 2. A similar right-side virtual array 1158 of twelve bistatic virtual antennas is formed by signals received by radar station 2 that are transmitted by radar station 1. The rightmost virtual bistatic antenna of the left-side virtual array 1156 is used for a first beat signal. The leftmost virtual bistatic antenna of the right-side virtual array 1158 is used for a second beat signal.

A third bistatic antenna 1160, in this case at the right side of the right-side virtual array 1158, is used for a third beat signal. Any bistatic virtual antenna may be used just as any of the bistatic antennas may be used for the first beat signal and the second beat signal.

This $3^{rd}$ bistatic beat signal can be written as in Eq. 31:

$$\check{S}^3_{k,beat}(f) \triangleq \check{S}^2_{k,beat}(f)\exp\{-j\varphi_d(f)\} \quad \text{Eq. 31}$$

the three bistatic signals, $\{\check{S}_{k,beat}^1(f), \check{S}_{k,beat}^2(f), \check{S}_{k,beat}^3(f)\}$, may be combined while preserving the direction angle. It is not corrected away by the initial phase and PN profile corrections, as discussed above.

Hence, an appropriate combining for an initial phase $\psi_k$ estimation of a d/2-offset uniform linear array (ULA), i.e., with no overlapping antenna in the ULA to preserve the direction information $\varphi_{d/2}$ may be performed as in Eq. 32 and Eq. 33.

$$\left.\begin{array}{l}\check{S}^1_{k,beat}(f) \approx \exp\{+j(\psi_k + \varphi_{d/2}(f))\} \cdot S_{k,0}(f) \\ \check{S}^2_{k,beat}(f) \approx \exp\{-j(\psi_k + \varphi_{d/2}(f))\} \cdot S_{k,0}(f) \\ \check{S}^3_{k,beat}(f) \triangleq \check{S}^2_{k,beat}(f)\exp\{-j\varphi_d(f)\}\end{array}\right\} \Rightarrow \check{\psi}_k \stackrel{def}{=} \quad \text{Eq. 32}$$

$$\frac{1}{2}\arg\left\{\int_0^{fmax}\left[\check{S}^1_{k,beat}(f)\left(\check{S}^2_{k,beat}(f)\right)^*\right]\left[\left(\check{S}^2_{k,beat}(f)\right)^*\check{S}^3_{k,beat}(f)\right]df\right\}$$

an indeed for the initial phase estimation $$\check{\psi}_k = \frac{1}{2}\arg\left\{\int_0^{fmax}\check{S}^1_{k,beat}(f)\left(\check{S}^2_{k,beat}(f)\right)^*|S_{k,0}(f)|^2\exp\{-j\varphi_d(f)\}df\right\} = \quad \text{Eq. 33}$$

$$\frac{1}{2}\arg\left\{\int_0^{fmax}\exp\{j2(\psi_k + \varphi_{d/2}(f))\}\exp\{-j\varphi_d(f)\}|S_{k,0}(f)|^4df\right\} =$$

$$\psi_k + \Phi_k + \frac{1}{2}\arg\left\{\int_0^{fmax}|S_{k,0}(f)|^4df\right\} = \psi_k + \Phi_k$$

with the described PN reduction apparatus and technique, the direction information $\varphi_{d/2}(f)$ will be not an integral part of the initial phase estimation $\check{\psi}_k$ as it was in techniques described above. In embodiments, the initial phase estimation is derived from generating the first beat signal of a first received reflected signal received at an antenna of the first linear antenna array, generating the second beat signal of a second received reflected signal received at a first antenna of the second linear antenna array, and generating the third beat signal of the second received reflected signal received at a second antenna of the second linear antenna array. A complex conjugate is taken of the second beat signal and then the first beat signal is multiplied with the complex conjugate of the second beat signal. The third beat signal is multiplied with the complex conjugate of the second beat signal, and these factors are multiplied with each other as shown in Eqs. 32 and 33. The initial phase estimation is generated from the multiplications. Hence, the direction information $\varphi_{d/2}(f)$ will not be removed by the corresponding initial phase and PN profile correction algorithm. The first, second and third signals and first and second arrays may be on the left or the right. While FIG. 11 shows the third signal as on the right, it may be on the left instead by defining the first antenna array as being on the left instead of the right as shown.

Radar Stations with Different Direction Information

While the above description concerns only a single direction information $\varphi_{d/2}(f)$ that should be preserved. However, with two radar stations, the angle of departure of these units may be different. Even with illuminating the same target within a scene, the angle of arrival of the bistatic signal originating from radar station 1 can be different than the angle of arrival of the bistatic signal originating from radar station 2. In this case, there may be a first direction information $\varphi_{1,d/2}(f)$ of radar station 1 and a different second direction information $\varphi_{2,d/2}(f)$ of radar station 2. For these bistatic antenna their Direction of Departure (DoD) and DoA are different and that might be recognized when $\varphi_{1,d/2}(f)$ unequal to $\varphi_{2,d/2}(f)$. Since, the phase information $\varphi_{1,d/2}(f)$ and $\varphi_{2,d/2}(f)$ is determined by the corresponding pathlength, there may be no need to make a distinction between $\varphi_{1,d/2}(f)$ and $\varphi_{2,d/2}(f)$. Nevertheless, in some embodiments, both $\varphi_{1,d/2}(f)$ and $\varphi_{2,d/2}(f)$ are independent functions of the beat frequency (i.e., "absorbing" pathlength differences). Their compensation, in the described PN reduction apparatus and technique is distinguished and compensated for inside the integral, i.e., compensation in frequency (f).

Hence, for the described PN reduction apparatus and technique with direction information $\{\varphi_{1,d/2}(f), \varphi_{2,d/2}(f)\}$ the composite plane wave approach is applied, i.e., there exists by virtue of the two linear antenna array assumption, two composite plane waves each with its own composite angle of direction. The direction information of both composite plane waves is preserved with the described PN reduction apparatus and technique. This may be accomplished in a manner similar to that for the same direction information, i.e., by introducing an extra beat signal for the spatial channel at the +3d/2 antenna of the (virtual) linear antenna array of radar station 1 as shown in FIG. 12.

Figure 12:
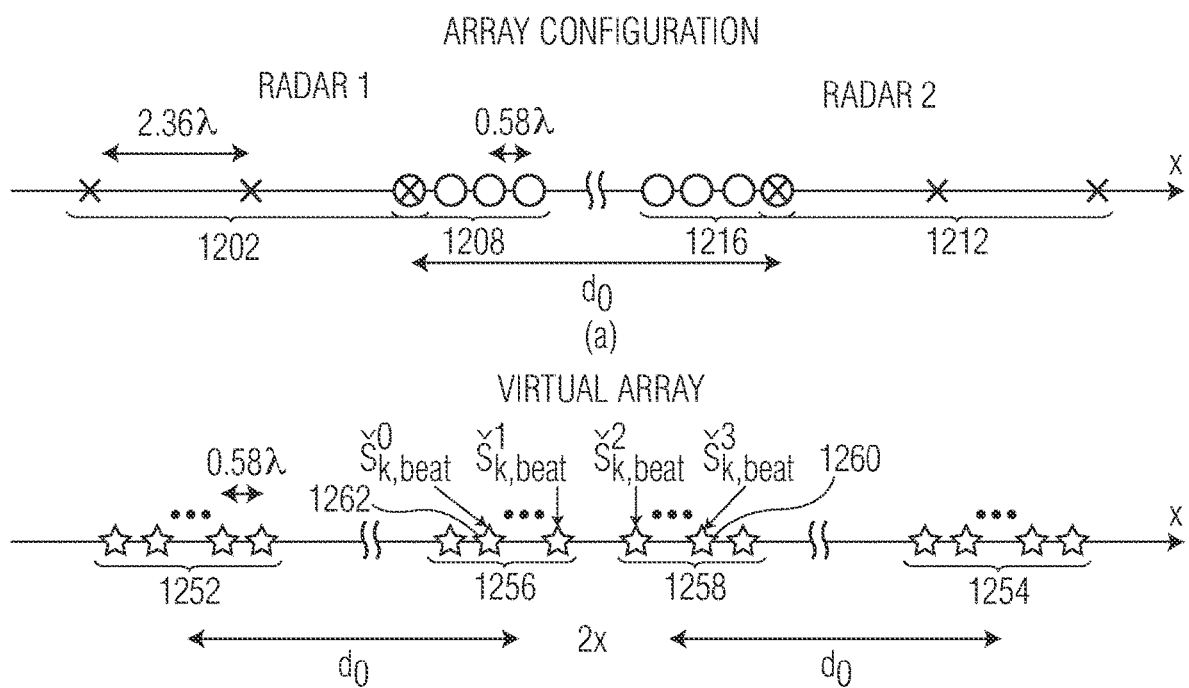
FIG. 12 is a diagram of two different linear antenna arrays with no shared central antenna and a fourth bistatic beat signal for PN reduction.

FIG. 12 is a diagram of two different linear antenna arrays with no shared central antenna and a fourth bistatic beat signal for PN reduction. The top line shows a physical antenna configuration with three physical transmit antennas 1202 on a left side antenna array for radar station 1 and three physical transmit antennas 1212 on a right-side antenna array for radar station 2. The antennas of each array are separated by a distance of 2.36λ and the nearest receive antennas of the two antenna arrays are separated by a distance $d_0$. Radar station 1 also has four receive antennas 1208 each separated by 0.58λ. Radar station 2 has a similar array 1216 of four receive antennas each separated by 0.58λ, where λ refers to the wavelength.

The bottom line in FIG. 12 shows a virtual array that can be derived using the three transmitters and four receivers of each of the two radar stations, radar station 1 and radar station 2. Radar station 1 has twelve monostatic virtual antennas 1252 at the left end of the linear array. Radar station 2 has twelve monostatic virtual antennas 1254 at the right end of the linear array. In the center, a left-side virtual array 1256 of twelve bistatic virtual antennas is formed by signals received by radar station 1 that are transmitted by radar station 2. A similar right-side virtual array 1258 of twelve bistatic virtual antennas is formed by signals received by radar station 2 that are transmitted by radar station 1. The rightmost virtual bistatic antenna of the left-side virtual array 1256 is used for a first beat signal. The leftmost virtual bistatic antenna of the right-side virtual array 1258 is used for a second beat signal. A third bistatic antenna 1260, in this case at the right side of the right-side virtual array 1258 is used for a third beat signal. A fourth bistatic antenna 1262, in this case at the left side of the left-side virtual array 1256 is used for a fourth beat signal. Any bistatic virtual antenna may be used just as any of the bistatic antennas may be used for the first beat signal and the second beat signal.

This $4^{th}$ bistatic beat signal, $\check{S}_{k,beat}^{0}(f)$, can then be written as in Eq. 34:

$$\check{S}_{k,beat}^{0}(f) \triangleq \check{S}_{k,beat}^{1}(f)\exp\{+j\varphi_{1,d}(f)\} \quad \text{Eq. 34}$$

By combining the four bistatic signals, $\{\check{S}_{k,beat}^{0}(f),\check{S}_{k,beat}^{1}(f),\check{S}_{k,beat}^{2}(f),\check{S}_{k,beat}^{3}(f)\}$, the direction information $\{\varphi_{1,d/2}(f),\varphi_{2,d/2}(f)\}$ will not end up in the initial phase estimation and will not be removed, i.e., corrected away, by the initial phase and PN profile corrections, as in the example discussed above.

Appropriate combining for the novel initial phase $\psi_k$ estimation of a d/2-offset ULA to preserve the direction information $\{\varphi_{1,d/2}(f),\varphi_{2,d/2}(f)\}$ can be written as in Eq. 35 and Eq. 36;

$$\left.\begin{array}{l} \check{S}_{k,beat}^{0}(f) \triangleq \check{S}_{k,beat}^{1}(f)\exp\{+j\varphi_{1,d}(f)\} \\ \check{S}_{k,beat}^{1}(f) \approx \exp\{+j(\psi_k+\psi_{1,d/2}(f))\} \cdot S_{k,0}(f) \\ \check{S}_{k,beat}^{2}(f) \approx \exp\{-j(\psi_k+\psi_{2,d/2}(f))\} \cdot S_{k,0}(f) \\ \check{S}_{k,beat}^{3}(f) \triangleq \check{S}_{k,beat}^{2}(f)\exp\{-j\varphi_{2,d}(f)\} \end{array}\right\} \Rightarrow \check{\psi}_k \stackrel{def}{=} \quad \text{Eq. 35}$$

$$\frac{1}{4}\arg\left\{\int_0^{f_{max}} \frac{\left[\left(\check{S}_{k,beat}^{0}(f)\right)^*\check{S}_{k,beat}^{1}(f)\right]\left[\check{S}_{k,beat}^{1}(f)\left(\check{S}_{k,beat}^{2}(f)\right)^*\right]}{\left[\check{S}_{k,beat}^{1}(f)\left(\check{S}_{k,beat}^{2}(f)\right)^*\right]\left[\left(\check{S}_{k,beat}^{2}(f)\right)^*\check{S}_{k,beat}^{3}(f)\right]} df\right\}$$

and the initial phase estimation becomes;

$$\check{\psi}_k = \frac{1}{4}\arg\left\{\int_0^{f_{max}} \begin{array}{l} |S_{k,0}(f)|^2\exp\{-j\varphi_{1,d}(f)\} \\ \left[\check{S}_{k,beat}^{1}(f)\left(\check{S}_{k,beat}^{2}(f)\right)^*\right]^2 \\ |S_{k,0}(f)|^2\exp\{-j\varphi_{2,d}(f)\}df \end{array}\right\} \quad \text{Eq. 36}$$

$$= \frac{1}{4}\arg\left\{\int_0^{f_{max}}\exp\{-j\varphi_{1,d}(f)\}\exp\{j(4\psi_k+2\psi_{1,d/2}(f)+2\psi_{2,d/2}(f))\}\exp\{-j\varphi_{2,d}(f)\}|S_{k,0}(f)|^8 df\right\}$$

$$= \psi_k+\Phi_k+\frac{1}{4}\arg\left\{\int_0^{f_{max}}|S_{k,0}(f)|^8 df\right\} = \psi_k+\Phi_k$$

with the described PN reduction apparatus and technique. As can be seen, the direction information $\{\varphi_{1,d/2}(f),\varphi_{2,d/2}(f)\}$ is not an integral part of the initial phase estimation $\check{\psi}_k$. Hence, the direction information $\{\varphi_{1,d/2}(f),\varphi_{2,d/2}(f)\}$ will not be removed by the initial phase and PN profile correction algorithm. Using the four beat signals, the complex conjugate of the fourth beat signal is multiplied with the first beat signal and this factor is added to the determination of the initial phase estimation as compared to that of Eq. 32 and 33 and the multiplication with this factor is shown in Eqs. 35 and 36.

Figure 13:
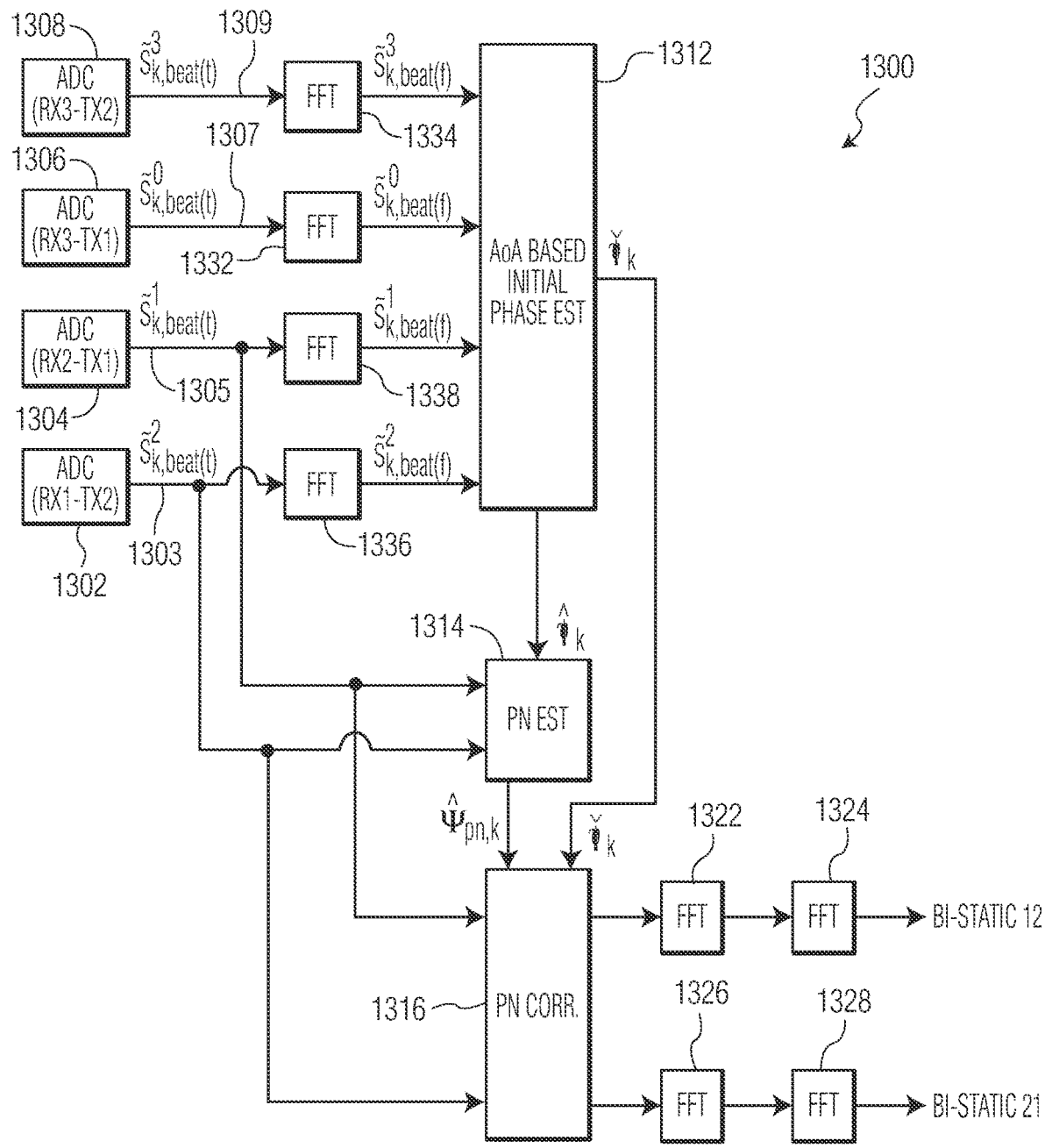
FIG. 13 is a block diagram of a compensation procedure on bistatic signals with estimates of the initial phases and the PN profile using additional beat signals to preserve direction information.

FIG. 13 is a block diagram of the described PN reduction apparatus to implement the techniques described above. A first beat signal 1303 is generated as a digitized signal by a first ADC 1302. The first beat signal is based on a comparison of a radar signal transmitted by a second transmitter TX2 and received, after reflection, at a first receiver RX1. A second beat signal 1305 is generated as a digitized signal by a second ADC 1304 based on a comparison of a radar signal transmitted by a first transmitter TX1 and received by a second receiver RX2. A third beat signal is 1307 is generated by a third ADC 1306 based on a comparison of a radar signal transmitted by the first transmitter TX1 and received by a third receiver RX3. A fourth beat signal 1309 is generated by a fourth ADC 1308 based on a comparison of a radar signal transmitted by the second transmitter TX2 and received by the third receiver RX3. All of the beat signals are bistatic so that the transmitter and the receiver are in different positions. To correct for the PN, each respective transmitter and receiver of a combination have a different one of the two clock sources. The first beat signal 1303, the second beat signal 1305, the third beat signal 1307 and the fourth beat signal 1309 correspond to the beat signal described in Eq. 35 in the frequency domain after the FFTs, 1332, 1334, 1336, 1338.

The first beat signal 1303 is applied to a first FFT 1336 to generate a frequency domain version of the first beat signal 1303. The second beat signal 1305 is applied to a second FFT 1338 to generate a frequency domain version of the second beat signal 1305. The third beat signal 1307 is applied to a third FFT 1332 to generate a frequency domain version of the third beat signal 1307. The fourth beat signal 1309 is applied to a fourth FFT 1334 to generate a frequency domain version of the fourth beat signal 1309. The frequency domain versions are provided to an AoA-based initial phase estimation 1312 that generates $\check{\psi}_k$ as described in Eq. 35 and Eq. 36 in the case of four beat signals and Eq. 32 and Eq. 33 in the case of three beat signals, and $\hat{\psi}_k$, as described in Eq. 20, using the first beat signal 1303 and the second beat signal 1305.

The first beat signal 1303 and the second beat signal 1305 are applied as time domain signals to a PN estimation 1314 together with the AoA-based initial phase estimation 1312 output $\check{\psi}_k$, to generate a PN estimate $\hat{\Psi}_{pn,k}$, as described in the context of Eq. 21. The initial phase estimation and the PN estimation are combined and provided to a PN correction 1316. The PN correction 1316 receives the first beat signal 1303 and the second beat signal 1305 in the time domain and applies a PN correction and an initial phase correction $\check{\psi}_k$ coming from the AoA-based initial phase estimation 1312 to the generated corrected beat signals. Each corrected beat signal is applied to an FFT chain 1322, 1324, 1326, 1328 to generate corrected radar output for further processing (not shown). Similar processing may be performed for all of the other beat signals collected by the radar stations.

The beat signals, i.e., the factors, in the integrals of Eq. 35 and Eq. 36 can be chosen in such a way that they can contain, actually, linear phase rotations different than to form a d/2 uniform linear array, for example, also for a non-uniform linear array with asymmetry for both bistatic linear arrays. This might be seen as a wider variant of the described PN reduction apparatus and technique, which is especially convenient for DoA estimations for non-uniform linear arrays, as described in more detail below.

Virtual Bistatic Antenna Arrays with Different Spacings

Until now, the distance between the two bistatic antenna arrays has been assumed to be equal to the distance between the two rightmost antennas of the left bistatic antenna array and to the distance between the two leftmost antennas of the right bistatic antenna array. In the more general case, as described above, a distance $d_1$ has been assumed between the two bistatic antenna arrays and a distance of $d_2$ has been assumed between the two rightmost antennas from the left bistatic antenna array and between the two leftmost antennas of the right bistatic antenna array. Hence, the four spectra, define the initial phase integral as defined in Eq. 37.

$$\left.\begin{array}{l}\check{S}_{k,beat}^{0}(f) \triangleq \check{S}_{k,beat}^{1}(f)\exp\{+j\varphi_{1,d_2}(f)\} = \\ \quad\check{S}_{k,beat}^{1}(f)\exp\left\{+j\frac{d_2}{d_1}\varphi_{1,d_1}(f)\right\} \\ \check{S}_{k,beat}^{1}(f) \approx \exp\{+j(\psi_k + \varphi_{1,d_1/2}(f))\}\cdot S_{k,0}(f) \\ \check{S}_{k,beat}^{2}(f) \approx \exp\{-j(\psi_k + \varphi_{2,d_1/2}(f))\}\cdot S_{k,0}(f) \\ \check{S}_{k,beat}^{3}(f) \triangleq \check{S}_{k,beat}^{2}(f)\exp\{-j\varphi_{2,d_2}(f)\} = \\ \quad\check{S}_{k,beat}^{2}(f)\exp\left\{-j\frac{d_1}{d_1}\varphi_{2,d_1}(f)\right\}\end{array}\right\} \Rightarrow \check{\psi}_k \stackrel{def}{=}$$

Eq. 37

$$\frac{1}{4}\arg\left\{\int_0^{f_{max}} \begin{array}{l}\left[\left(\check{S}_{k,beat}^{0}(f)\right)^*\check{S}_{k,beat}^{1}(f)\right]^{\frac{d_1}{d_2}}\left[\check{S}_{k,beat}^{1}(f)\left(\check{S}_{k,beat}^{2}(f)\right)^*\right] \\ \left[\check{S}_{k,beat}^{1}(f)\left(\check{S}_{k,beat}^{2}(f)\right)^*\right]\left[\left(\check{S}_{k,beat}^{2}(f)\right)^*\check{S}_{k,beat}^{3}(f)\right]^{\frac{d_1}{d_2}}\end{array} df\right\}$$

The initial phase estimation is then as stated in Eq. 38.

$$\check{\psi}_k = \frac{1}{4}\arg\left\{\int_0^{f_{max}} \begin{array}{l}\left(|S_{k,0}(f)|^2\exp\left\{-j\frac{d_2}{d_1}\varphi_{1,d_1}(f)\right\}\right)^{\frac{d_1}{d_2}} \\ \left[\check{S}_{k,beat}^{1}(f)\left(\check{S}_{k,beat}^{2}(f)\right)^*\right]^2 \\ \left(|S_{k,0}(f)|^2\exp\left\{-j\frac{d_2}{d_1}\varphi_{2,d_1}(f)\right\}\right)^{\frac{d_1}{d_2}} df\end{array}\right\} =$$

Eq. 38

$$\frac{1}{4}\arg\left\{\int_0^{f_{max}}\exp\{-j\varphi_{1,d_1}(f)\}\exp\{j(4\psi_k + 2\varphi_{1,d_1/2}(f) + 2\varphi_{2,d_1/2}(f))\}\right.$$

$$\left.\exp\{-j\varphi_{2,d_1}(f)\}|S_{k,0}(f)|^{4+4\frac{d_1}{d_2}}df\right\} =$$

$$\psi_k + \Phi_k + \frac{1}{4}\arg\left\{\int_0^{f_{max}}|S_{k,0}(f)|^{4+4\frac{d_1}{d_2}}df\right\} = \psi_k + \Phi_k$$

Accordingly, the direction information $\{\varphi_{1,d_1/2}(f), \varphi_{2,d_1/2}(f)\}$ will be not an integral part of the initial phase estimation $\check{\psi}_k$. Hence, also here, the direction information $\{\varphi_{1,d_1/2}(f), \varphi_{2,d_1/2}(f)\}$ will not be removed by the initial phase and by the PN profile correction algorithm.

The above-described principles may be extended. Since the estimation integral for the initial phase estimation $\check{\psi}_k$ starts at zero, and since low beat frequencies represent short ranges that might suffer from near-field issues, the integration may be started at a minimum beat frequency $f_{min}$ that corresponds with a minimum range. Instead of integrating over the whole spectrum, i.e., all frequencies, partial integration may be used where, for example, each part of the frequency corresponds with a peak in the range spectrum. This might also beneficial for preventing the integration of noise between the peaks in the range spectrum. In some situations two targets may have the same range but different DoA information. In this case the corresponding beat frequency regions could lead to deterioration of the initial phase $\check{\psi}_k$ estimation. To avoid the deterioration the corresponding beat frequencies may be excluded from the estimation method. This may be done by estimating the initial phase $\check{\psi}_k$ within disjunct frequency regions and applying a kind of majority voting on these estimates. In this way, it might be possible to exclude outliers in the initial phase $\check{\psi}_k$ estimates. The outliers might be due to the fact that there are multiple targets at the same distance with different DoAs, as described above.

The structures and techniques described herein are not limited to the signal applied to only the most left or right antennas of the antenna arrays but can also be applied to other antennas of the antenna array and multiples of these signals can be used, for example, to apply noise averaging.

The d/2-uniform linear antenna array is used above as an example for explanation of the described PN reduction radar structure and technique. The symmetry and similarity to the overlap uniform linear antenna array makes it a good model for explaining the concepts. However, the described embodiments are not limited to the d/2-uniform linear antenna array. Any other symmetry of two parts, representing different bistatic signals of the antenna array may be used.

Figure 14:
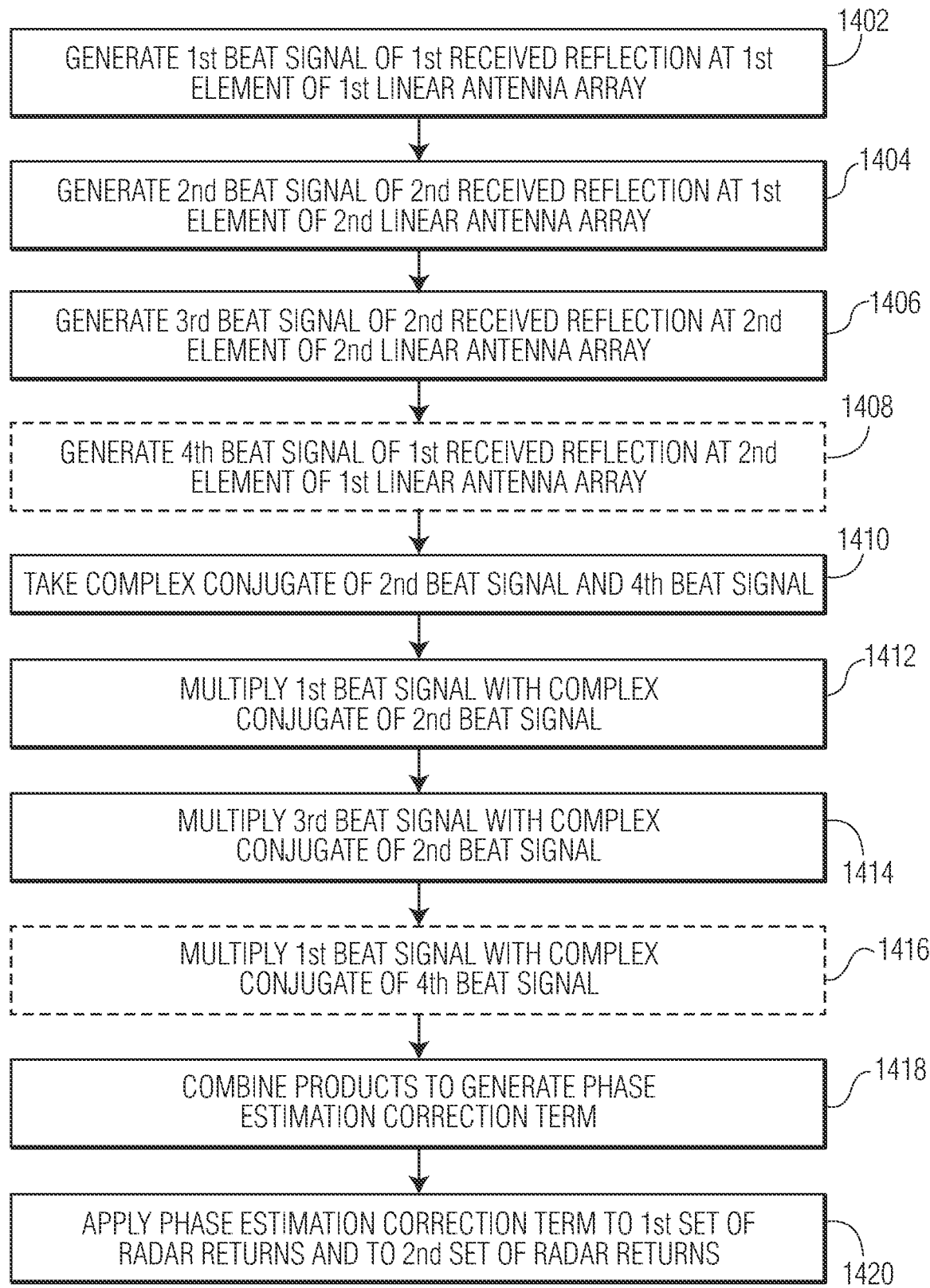
FIG. 14 is a process flow diagram of compensation of bistatic signals with estimates of the initial phases and the PN profile using additional beat signals to preserve direction information.

FIG. 14 is a process flow diagram of compensation of bistatic signals with estimates of the initial phases and the PN profile using additional beat signals to preserve direction information. The bistatic signals are created by emitting a first signal from antennas of a first linear antenna array and emitting a second signal from antennas of a second linear antenna array. The two linear antenna arrays are from two different radio units with different reference clock sources. The first signal is then received at antennas of the second linear antenna array as a reflected signal from a target in the scene in front of the antenna arrays. The second signal is received at antennas of the first linear antenna array as reflected signals of the second signal from the target for a bistatic system. The reflected signals may be referred to as a first set of radar return signals and a second set of radar return signals.

The process flow begins at operation 1402 with generating a first beat signal of a first reflected signal received at an antenna of the first linear antenna. Operation 1404 refers to generating a second beat signal of a second reflected signal received at a first antenna of the second linear antenna array. Operation 1406 refers to generating a third beat signal of the second reflected signal received at a second antenna of the second linear antenna array.

In embodiments, a fourth beat signal is optionally used. Operation 1408 refers to an option operation of generating a fourth beat signal of the first reflected signal received at a second antenna of the first linear antenna array in the time domain. The beat signals may be generated by down-converting the received reflected signals using the corresponding transmitted signal. In some embodiments, one or more of the antennas of the antenna arrays are virtual antennas.

Operation 1410 refers to taking a complex conjugate of the second beat signal, and, optionally, if present, taking a complex conjugate of the fourth beat signal. Operation 1412 refers to multiplying the first beat signal with the complex conjugate of the second beat signal and at operation 1414 multiplying the third beat signal with the complex conjugate of the second beat signal to produce a first product and a second product. Operation 1416 refers to optionally multiplying the first beat signal with the complex conjugate of the fourth beat signal when the fourth beat signal is present. In embodiments the signals are first converted to the frequency domain using, for example, a fast Fourier transform, and the multiplication are performed in the frequency domain.

Operation 1418 refers to combining the products, the first product and the second product, to generate a phase estimation correction term and operation 1420 refers to applying the phase estimation correction term to the first set of radar return signals and to the second set of radar return signals.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

Figure 15:
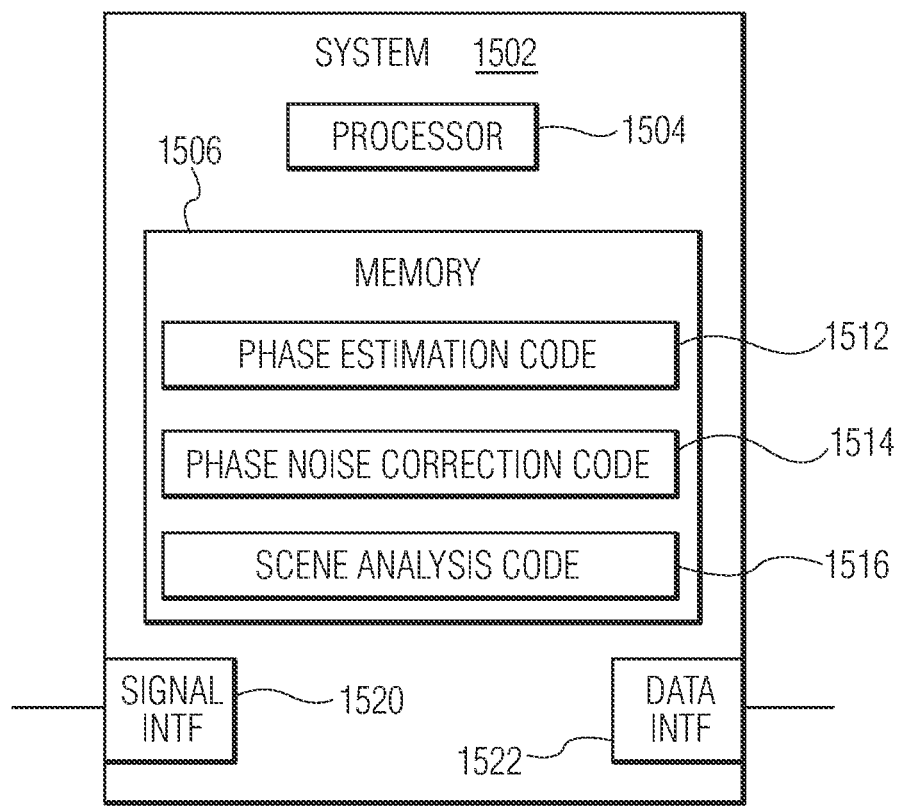
FIG. 15 is a block diagram of a computing system having a processor and a computer-useable memory.

FIG. 15 is an example of a computer 1502 having a processor 1504 and a computer-useable memory 1506 or storage medium or suitable for performing operations as described herein. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

The computer 1502 has a signal interface 1520 to send and receive signals to and from an antenna array, for example, radio-frequency radar signals, and a data interface 1522 to send and receive data and control signals with external components. The computer-useable memory 1506 includes phase estimation code 1512 for use by the processor 1504 for estimating an initial phase and phase noise. The computer-useable memory 1506 includes phase noise correction code 1514 for use by the processor 1504 for correcting initial phase and phase noise. The computer-useable memory 1506 includes scene analysis code 1516 for use by the processor for analyzing a scene that includes target detected by the received radar signals.

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of reducing phase noise in radar return signals from bistatic antenna arrays, the method comprising:
 emitting a first signal from antennas of a first linear antenna array;
 emitting a second signal from antennas of a second linear antenna array;
 receiving reflected signals of the first signal at the antennas of the second linear antenna array as a first set of radar return signals;
 receiving reflected signals of the second signal at the antennas of the first linear antenna array as a second set of radar return signals;
 generating a first beat signal based on a first reflected signal received at an antenna of the first linear antenna array;
 generating a second beat signal based on a second reflected signal received at a first antenna of the second linear antenna array;
 generating a third beat signal based on the second reflected signal received at a second antenna of the second linear antenna array;
 determining a complex conjugate of the second beat signal;
 multiplying the first beat signal with the complex conjugate of the second beat signal and multiplying the third beat signal with the complex conjugate of the second beat signal to produce a first product and a second product;
 determining a phase estimation correction term based on frequency domain versions and time domain versions of the first product and the second product; and
 applying the phase estimation correction term to the first set of radar return signals and to the second set of radar return signals.

2. The method of claim 1, further comprising:
 generating a fourth beat signal based on the first reflected signal received at a second antenna of the first linear antenna array;
 determining a complex conjugate of the fourth beat signal; and
 multiplying the first beat signal with the complex conjugate of the fourth beat signal to produce a third product,
 wherein generating the phase estimation correction term further comprises combining the third product with the first product and the second product.

3. The method of claim 2, further comprising comparing the third beat signal and the fourth beat signal to a frequency threshold and wherein multiplying comprises multiplying in response to the third beat signal and the fourth beat signal exceeding the frequency threshold.

4. The method of claim 1, wherein a distance between the first and the second antennas of the first linear antenna array is equal to the distance between the first antenna and the second antenna of the second linear antenna array.

5. The method of claim 1, wherein multiplying comprises multiplying the first beat signal in a frequency domain with the complex conjugate of the second beat signal in the frequency domain and multiplying the third beat signal in the frequency domain with the complex conjugate of the second beat signal in the frequency domain.

6. The method of claim 1, wherein the first reflected signal is transmitted by the second linear antenna array, wherein the second reflected signal is transmitted by the first linear antenna array, wherein generating the first beat signal comprises down-converting the first reflected signal from a first antenna of the second linear antenna array with a transmitted signal of the first linear antenna array, wherein generating the second beat signal comprises down-converting the second reflected signal from a first antenna of the first linear antenna array with a transmitted signal of the second linear antenna array, and wherein generating the third beat signal comprises down-converting the first reflected signal from a second antenna of the second linear antenna array with a transmitted signal of the first linear antenna array.

7. The method of claim 1, wherein applying the phase estimation correction term comprises applying the phase estimation correction term to each reflected signal at each antenna of the first linear antenna array and each antenna of the second linear antenna array.

8. The method of claim 1, wherein applying the phase estimation correction term comprises applying the phase estimation correction term to the first set of radar return signals and the second set of radar return signals in a time domain.

9. The method of claim 1, wherein the antenna of the first linear antenna array and the first antenna of the second linear antenna array are virtual antennas between a first physical antenna array and a second physical antenna array.

10. The method of claim 1, wherein the first linear antenna array and the second linear antenna array are separated by a predetermined fixed distance.

11. The method of claim 1, wherein the first linear antenna array and the second linear antenna array have approximately a same spacing between antennas.

12. The method of claim 1, further comprising performing a clock rate equalization of signal sources used for generation of the first signal and the second signal.

13. A non-transitory computer-readable medium having instructions stored thereon that when operated on by the computer cause the computer to perform operations comprising:
generating a first beat signal based on a first reflected signal of a second signal from antennas of a second linear antenna array and received at an antenna of a first linear antenna array;
generating a second beat signal based on a second reflected signal of a first signal from antennas of the first linear antenna array and received at a first antenna of the second linear antenna array;
generating a third beat signal based on the second reflected signal received at a second antenna of the second linear antenna array;
determining a complex conjugate of the second beat signal;
multiplying the first beat signal with the complex conjugate of the second beat signal to produce a first product and multiplying the third beat signal with the complex conjugate of the second beat signal to produce a second product;
determining a phase estimation correction term based on frequency domain versions and time domain versions of the first product and the second product; and
applying the phase estimation correction term to a first set of radar return signals and to a second set of radar return signals the first set of radar return signals being reflected signals of the first signal received at the second linear antenna array and the second set of radar return signals being reflected signals of the second signal received at the first linear antenna array.

14. The medium of claim 13, the operations further comprising:
generating a fourth beat signal based on of the first reflected signal received at a second antenna of the first linear antenna array; and
generating a complex conjugate of the fourth beat signal, wherein generating the phase estimation correction term further comprises multiplying the first beat signal with the complex conjugate of the fourth beat signal.

15. The medium of claim 13, wherein multiplying comprises multiplying the first beat signal in a frequency domain with the complex conjugate of the second beat signal in the frequency domain and multiplying the third beat signal in the frequency domain with the complex conjugate of the second beat signal in the frequency domain.

16. An apparatus comprising:
a first linear antenna array configured to emit a first signal from antennas of the first linear antenna array and to receive reflected signals of a second signal at the antennas of the first linear antenna array as a second set of radar return signals;
a second linear antenna array configured to emit the second signal from antennas of the second linear antenna array and to receive reflected signals of the first signal at the antennas of the second linear antenna array as a first set of radar return signals;
a first mixer configured to generate a first beat signal based on a first reflected signal at an antenna of the first linear antenna array;
a second mixer configured to generate a second beat signal based on a second reflected signal at a first antenna of the second linear antenna array and to generate a third beat signal based on the second reflected signal at a second antenna of the second linear antenna array; and
an initial phase estimation module configured to take a complex conjugate of the second beat signal, to multiply the first beat signal with the complex conjugate of the second beat signal to produce a first product, to multiply the third beat signal with the complex conjugate of the second beat signal to produce a second product, to generate a phase estimation correction term based on frequency domain versions and time domain versions of the first product and the second product, and to apply the phase estimation correction term to the first set of radar return signals and to the second set of radar return signals.

17. The apparatus of claim 16, wherein the antenna of the first linear antenna array and the antenna of the second linear antenna array are characterized as virtual antennas between a first physical antenna array and a second physical antenna array.

18. The apparatus of claim 16, wherein the first linear antenna array and the second linear antenna array are separated by a predetermined fixed distance and wherein the first linear antenna array and the second linear antenna array have approximately a same spacing between antennas.

19. The apparatus of claim 16, wherein a distance between the first and the second antennas of the first linear antenna array is equal to a distance between the first and second antennas of the second linear antenna array.

20. The apparatus of claim 16, further comprising a processor configured to determine a position of an object using the first set of radar return signals and the second set of radar return signals.

* * * * *